(12) United States Patent  (10) Patent No.: US 10,697,774 B2
Prikhodko et al.  (45) Date of Patent: Jun. 30, 2020

(54) BALANCED RUNNERS SYNCHRONIZING MOTION OF MASSES IN MICROMACHINED DEVICES

(71) Applicant: Analog Devices, Inc., Norwood, MA (US)

(72) Inventors: Igor P. Prikhodko, Reading, MA (US); John A. Geen, Tewksbury, MA (US); Jeffrey A. Gregory, Malden, MA (US)

(73) Assignee: Analog Devices, Inc., Norwood, MA (US)

( * ) Notice: Subject to any disclaimer, the term of this patent is extended or adjusted under 35 U.S.C. 154(b) by 433 days.

(21) Appl. No.: 15/383,366

(22) Filed: Dec. 19, 2016

(65) Prior Publication Data

US 2018/0172445 A1  Jun. 21, 2018

(51) Int. Cl.
*G01C 19/574* (2012.01)

(52) U.S. Cl.
CPC .................... *G01C 19/574* (2013.01)

(58) Field of Classification Search
CPC ................................................ G01C 19/574
USPC ...................................................... 73/504.12
See application file for complete search history.

(56) References Cited

U.S. PATENT DOCUMENTS

| | | |
|---|---|---|
| 5,241,861 A | 9/1993 | Hulsing, II |
| 5,392,650 A | 2/1995 | O'Brien et al. |
| 5,600,064 A | 2/1997 | Ward |
| 5,635,638 A | 6/1997 | Geen |
| 5,869,760 A | 2/1999 | Geen |
| 6,230,563 B1 | 5/2001 | Clark et al. |
| 6,257,059 B1 | 7/2001 | Weinberg et al. |
| 6,370,937 B2 | 4/2002 | Hsu |
| 6,505,511 B1 | 1/2003 | Geen et al. |
| 6,571,630 B1 | 6/2003 | Weinberg et al. |
| 6,705,164 B2 | 3/2004 | Willig et al. |
| 6,752,017 B2 | 6/2004 | Willig et al. |
| 6,845,668 B2 | 1/2005 | Kim et al. |
| 6,860,151 B2 | 3/2005 | Platt et al. |

(Continued)

FOREIGN PATENT DOCUMENTS

| | | |
|---|---|---|
| CN | 101160506 A | 4/2008 |
| JP | 2008-537114 A | 9/2008 |

(Continued)

OTHER PUBLICATIONS

Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.

(Continued)

*Primary Examiner* — Nathaniel T Woodward
(74) *Attorney, Agent, or Firm* — Wolf, Greenfield & Sacks, P.C.

(57) ABSTRACT

Micromachined inertial devices are presented having multiple linearly-moving masses coupled together by couplers that move in a linear fashion when the coupled masses exhibit anti-phase motion. The couplers move in opposite directions of each other, such that one coupler on one side of the movable masses moves in a first linear direction and another coupler on the opposite side of the movable masses moves in a second linear direction opposite the first linear direction. The couplers ensure proper anti-phase motion of the masses.

20 Claims, 18 Drawing Sheets

(56) References Cited

U.S. PATENT DOCUMENTS

| | | | |
|---|---|---|---|
| 6,877,374 | B2 | 4/2005 | Geen |
| 6,883,361 | B2 | 4/2005 | Wyse |
| 7,032,451 | B2 | 4/2006 | Geen |
| 7,036,373 | B2 | 5/2006 | Johnson et al. |
| 7,204,144 | B2 | 4/2007 | Geen |
| 7,222,533 | B2 | 5/2007 | Mao et al. |
| 7,227,432 | B2 | 6/2007 | Lutz et al. |
| 7,284,429 | B2 | 10/2007 | Chaumet et al. |
| 7,287,428 | B2 | 10/2007 | Green |
| 7,313,958 | B2 | 1/2008 | Willig et al. |
| 7,347,094 | B2 | 3/2008 | Geen et al. |
| 7,421,897 | B2 | 9/2008 | Geen et al. |
| 7,675,217 | B2 | 3/2010 | Delevoye et al. |
| 8,096,181 | B2 | 1/2012 | Fukomoto |
| 8,266,961 | B2 | 9/2012 | Kuang et al. |
| 8,322,213 | B2 * | 12/2012 | Trusov ............... G01C 19/5747 73/504.12 |
| 8,342,023 | B2 | 1/2013 | Geiger |
| 8,354,900 | B2 | 1/2013 | Cazzaniga et al. |
| 8,453,504 | B1 | 6/2013 | Mao |
| 8,490,483 | B2 | 7/2013 | Wrede et al. |
| 8,539,832 | B2 | 9/2013 | Potasek et al. |
| 8,656,776 | B2 | 2/2014 | Trusov et al. |
| 8,783,105 | B2 | 7/2014 | Kuhlmann et al. |
| 8,794,067 | B2 | 8/2014 | Schmid et al. |
| 8,844,357 | B2 | 9/2014 | Scheben et al. |
| 8,991,247 | B2 | 3/2015 | Trusov et al. |
| 9,212,908 | B2 | 12/2015 | Geen et al. |
| 9,217,756 | B2 | 12/2015 | Simon et al. |
| 9,493,340 | B2 | 11/2016 | Mahameed et al. |
| 10,317,210 | B2 | 6/2019 | Kub et al. |
| 10,415,968 | B2 | 9/2019 | Prikhodko et al. |
| 2006/0213265 | A1 | 9/2006 | Weber et al. |
| 2006/0230830 | A1 | 10/2006 | Geen et al. |
| 2007/0062282 | A1 | 3/2007 | Akashi et al. |
| 2008/0282833 | A1 | 11/2008 | Chaumet |
| 2009/0223277 | A1 | 9/2009 | Rudolf et al. |
| 2010/0313657 | A1 | 12/2010 | Trusov et al. |
| 2012/0060604 | A1 | 3/2012 | Neul et al. |
| 2012/0125099 | A1 | 5/2012 | Scheben et al. |
| 2012/0210788 | A1 | 8/2012 | Günther et al. |
| 2012/0222483 | A1 | 9/2012 | Blomqvist et al. |
| 2013/0192363 | A1 | 8/2013 | Loreck |
| 2013/0269413 | A1 | 10/2013 | Tao et al. |
| 2014/0190258 | A1 | 7/2014 | Donadel et al. |
| 2014/0260608 | A1 | 9/2014 | Lin et al. |
| 2015/0285633 | A1 | 10/2015 | Kamal Said Abdel Aziz et al. |
| 2015/0330783 | A1 | 11/2015 | Rocchi et al. |
| 2016/0025493 | A1 | 1/2016 | Stewart |
| 2016/0264404 | A1 | 9/2016 | Acar |
| 2016/0316146 | A1 | 10/2016 | Kajimura |
| 2016/0349056 | A1 | 12/2016 | Thompson et al. |
| 2018/0058853 | A1 | 3/2018 | Jia et al. |
| 2018/0172446 | A1 | 6/2018 | Prikhodko et al. |
| 2018/0172447 | A1 | 6/2018 | Prikhodko et al. |
| 2019/0310087 | A1 | 10/2019 | Gregory et al. |

FOREIGN PATENT DOCUMENTS

| | | |
|---|---|---|
| JP | 2011145129 A | 7/2011 |
| JP | 2014-510271 A | 4/2014 |
| WO | WO 2012/120190 A2 | 9/2012 |

OTHER PUBLICATIONS

Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.

Park et al., Dynamics and control of a MEMS angle measuring gyroscope. Sensors and Actuator A: Physical 144.1 (2008): 56-63.

Zaman et al., A mode-matched silicon-yaw tuning-fork gyroscope with subdegree-per-hour Allan deviation bias instability. Journal of Microelectromechanical Systems 17.6 (2008): 1526-36.

Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart ,Germany. Sep. 16-17; pp. 3.0-3.8.

Kranz, Design, Simulation and Implementation of Two Novel Micromechanical Vibratory-Rate Gyroscopes. Department of Electrical and Computer Engineering. Carnegie Mellon University. May 1988. 41 pages.

Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.

Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014. 7 pages.

Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

* cited by examiner

BALANCED RUNNERS SYNCHRONIZING MOTION OF MASSES IN MICROMACHINED DEVICES

FIELD OF THE DISCLOSURE

This disclosure relates to microelectromechanical systems (MEMS) devices having multiple moving masses.

BACKGROUND

Gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the "drive axis." When the gyroscope experiences rotation, the proof mass additionally moves along an axis different than the drive axis, sometimes referred to as the sense axis. For some MEMS gyroscopes, rotation causes the proof mass to move linearly along the sense axis. For others, rotation causes the proof mass to rotate. The motion of the proof mass along the sense axis is detected, providing an indication of the rotation experienced by the gyroscope.

Some MEMS gyroscopes include multiple proof masses that are mechanically coupled together. The proof masses can be coupled together in an attempt to provide synchronous motion while rejecting undesired motion in either the sense or drive axes.

SUMMARY OF THE DISCLOSURE

Micromachined inertial devices are presented having multiple linearly-moving masses coupled together by couplers that move in a linear fashion when the coupled masses exhibit anti-phase motion. The couplers move in opposite directions of each other, such that one coupler on one side of the movable masses moves in a first linear direction and another coupler on the opposite side of the movable masses moves in a second linear direction opposite the first linear direction. The couplers ensure proper anti-phase motion of the masses.

In certain embodiments, a multiple-mass, balanced microelectromechanical systems (MEMS) device is provided that comprises a substrate, a first proof mass coupled to the substrate by a first tether and configured to move linearly, and a second proof mass coupled to the substrate by a second tether and configured to move linearly. The multiple-mass, balanced MEMS device further comprises a first coupler coupling the first and second proof masses together and configured to move linearly when the first proof mass moves in a first direction and the second proof mass moves in a second direction opposite the first direction.

In certain embodiments, a method of operating a multiple-mass, balanced microelectromechanical systems (MEMS) device is provided that comprises moving a first proof mass and second proof mass linearly in anti-phase motion, and linearly translating a first coupler coupling the first and second proof masses as the first and second proof masses move linearly in anti-phase motion.

In certain embodiments, a multiple-mass, balanced microelectromechanical systems (MEMS) device is provided, comprising a substrate, a first proof mass coupled to the substrate by a first tether and configured to move linearly, and a second proof mass coupled to the substrate by a second tether and configured to move linearly. The multiple-mass, balanced MEMS device further comprises means for inhibiting in-phase motion of the first and second proof masses.

In certain embodiments, a synchronized mass microelectromechanical systems (MEMS) device is provided, comprising a substrate, a first proof mass coupled to the substrate by a first tether and configured to move linearly parallel to each of first and second transverse axes, a second proof mass coupled to the substrate by a second tether and configured to move linearly parallel to each of the first and second transverse axes, a third proof mass coupled to the substrate by a third tether and configured to move linearly parallel to each of the first and second transverse axes, and a fourth proof mass coupled to the substrate by a fourth tether and configured to move linearly parallel to each of the first and second transverse axes. The device further comprises a first coupler coupling the first and second proof masses together and configured to move linearly parallel to the first axis when the first proof mass moves in a first direction parallel to the second axis and the second proof mass moves in a second direction opposite the first direction parallel to the second axis.

In certain embodiments, a method of operating a synchronized mass microelectromechanical systems (MEMS) device having four proof masses coupled together is provided, the method comprising moving the four proof masses in linear anti-phase motion parallel to a first axis, linearly translating a first coupler coupling first and second proof masses of the four proof masses when the four proof masses move in linear anti-phase motion parallel to the first axis, and linearly translating a second coupler coupling third and fourth proof masses of the four proof masses when the four proof masses move in linear anti-phase motion parallel to the first axis.

In certain embodiments, a synchronized mass, balanced microelectromechanical systems (MEMS) gyroscope is provided, comprising a substrate, first, second, third, and fourth proof masses suspended above and coupled to the substrate and each configured to translate linearly parallel to first and second axes, and means for enforcing linear anti-phase motion of the four proof masses parallel to the first axis.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2E-2 illustrates a first state of deformation of the structure of FIG. 2E-1 in which the pivoting linkage segments pivot in opposite directions.

FIG. 2E-3 illustrates a second state of deformation of the structure of FIG. 2E-1 in which the pivoting linkage segments pivot in the same direction as each other.

FIG. 2F-1 is a close-up view of a box spring connector for coupling neighboring proof masses in the gyroscope of FIG. 2A.

FIG. 2F-2 illustrates permitted motion of the structure of FIG. 2F-1.

FIG. 2F-3 illustrates prevented motion of the structure of FIG. 2F-1.

FIG. 2I illustrates a state of deformation of the gyroscope of FIG. 2H in which the proof masses exhibit anti-phase motion in the y-direction.

DETAILED DESCRIPTION

Figure 1A:
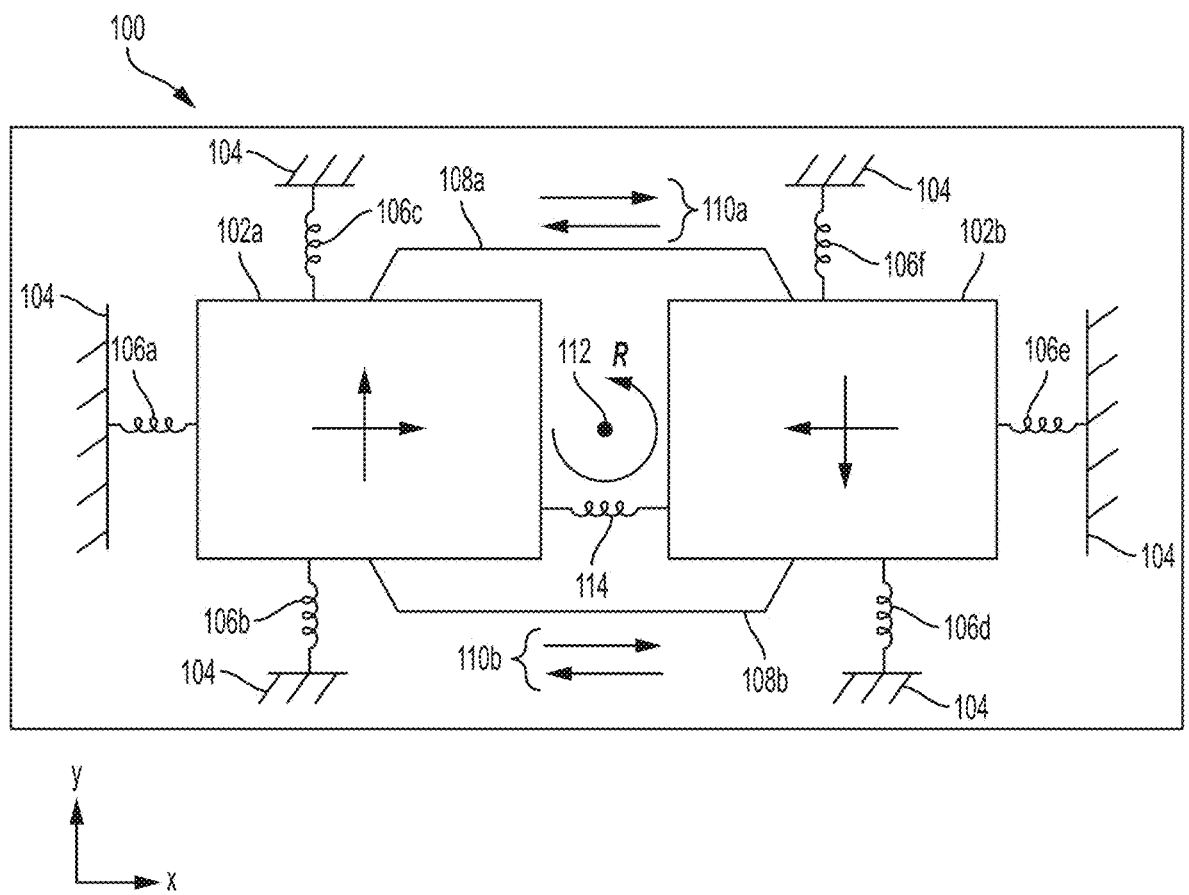
FIG. 1A is a block diagram representation of a microelectromechanical systems (MEMS) device having multiple proof masses coupled together by linearly moving runners, according to an embodiment of the present application.

Aspects of the present disclosure provide micromachined or microelectromechanical systems (MEMS) devices having multiple proof masses coupled together by linearly moving mechanical couplers which constrain the motion of the coupled proof masses to synchronous, linear anti-phase motion. The couplers move linearly as the proof masses exhibit linear anti-phase motion, rather than pivoting or rotating. Thus, they are referred to herein as "runners" in at least some embodiments, and serve as coupling and motion transfer mechanisms.

In some embodiments, the MEMS device includes multiple such runners configured to move in opposite directions of each other, thus providing balanced operation with no net momentum from the linear motion of the runners. This may prevent unwanted motion of the proof masses, ensuring rejection of linear and angular accelerations. The oppositely-moving runners may have substantially the same masses and/or displacements as each other.

In some embodiments, two or more proof masses of a MEMS device are arranged in a proof mass arrangement, with runners positioned on opposite sides of the proof mass arrangement. The runners on opposite sides of the proof mass arrangement may move linearly in opposite directions of each other, thus providing balanced operation. In some embodiments, multiple oppositely moving runners are provided both on the same side of the proof mass arrangement as each other and on opposite sides of the proof mass arrangement as each other. Thus, in some embodiments, four or more runners may be provided in a MEMS device.

Various types of MEMS devices may include runners of the types described herein. For example, MEMS gyroscopes, accelerometers, and resonators may include two or more proof masses coupled by balanced runners of the types described herein. Other micromachined devices are possible.

According to an aspect of the present disclosure, runners of the types described herein are included in a MEMS gyroscope, coupling two linearly moving proof masses of the MEMS gyroscope. The couplers may be configured to move linearly when the proof masses are driven along a drive axis and/or when sensing motion of the proof masses along a sense axis. For example, the couplers may be arranged to move linearly in response to the gyroscope experiencing rotation. The runners may resist moving when the gyroscope experiences shock or other forms of acceleration (e.g., linear or angular acceleration), and therefore gyroscopes implementing such couplers may exhibit reduced acceleration sensitivity and may be referred to as acceleration insensitive gyroscopes. In some embodiments, the runners are arranged to provide synchronous motion in both drive and sense modes of the gyroscope or other MEMS sensor.

In some embodiments, a synchronized mass gyroscope is provided, including four proof masses coupled by runners of the types described herein. The runners may be configured to enforce linear, anti-phase motion of the four coupled proof masses. This may facilitate momentum balanced operation of the synchronized mass gyroscope. Additionally, the runners may themselves be momentum-balanced so that their own motion does not impart a net momentum to the gyroscope.

FIG. 1A illustrates in simplified form a MEMS device according to an aspect of the present application, having two proof masses coupled by linearly moving couplers ("runners") which resist (or inhibit) symmetric motion (also referred to as "in-phase" motion) of the proof masses and allow antisymmetric motion (also referred to as "anti-phase" motion) of the proof masses. The MEMS device 100 includes a first proof mass 102a, second proof mass 102b, a substrate 104, tethers 106a, 106b, 106c, 106d, 106e, and 106f, runners 108a and 108b, and a coupler 114.

The proof masses 102a and 102b are shown in simplified block diagram form, but may have any suitable size and shape, and may be formed of any suitable material(s). In some embodiments, the proof masses 102a and 102b are substantially rectangular, such as being substantially square. They may be formed of silicon, or another suitable material. The proof masses 102a and 102b may be substantially identical in at least some embodiments.

The substrate 104 may be a silicon substrate (e.g., a silicon die cut from a silicon wafer) or other substrate compatible with micromachining techniques. In some embodiments, the substrate 104 is formed of the same material as the proof masses 102a and 102b. The proof masses 102a and 102b may be formed from the substrate 104 by suitable micromachining techniques, such as through lithography and etching processes. In some embodiments, formation of the proof masses 102a and 102b may involve a release step, in which the proof masses are released from the substrate 104 and thus separated from the substrate by a gap (or cavity).

Figure 2A:
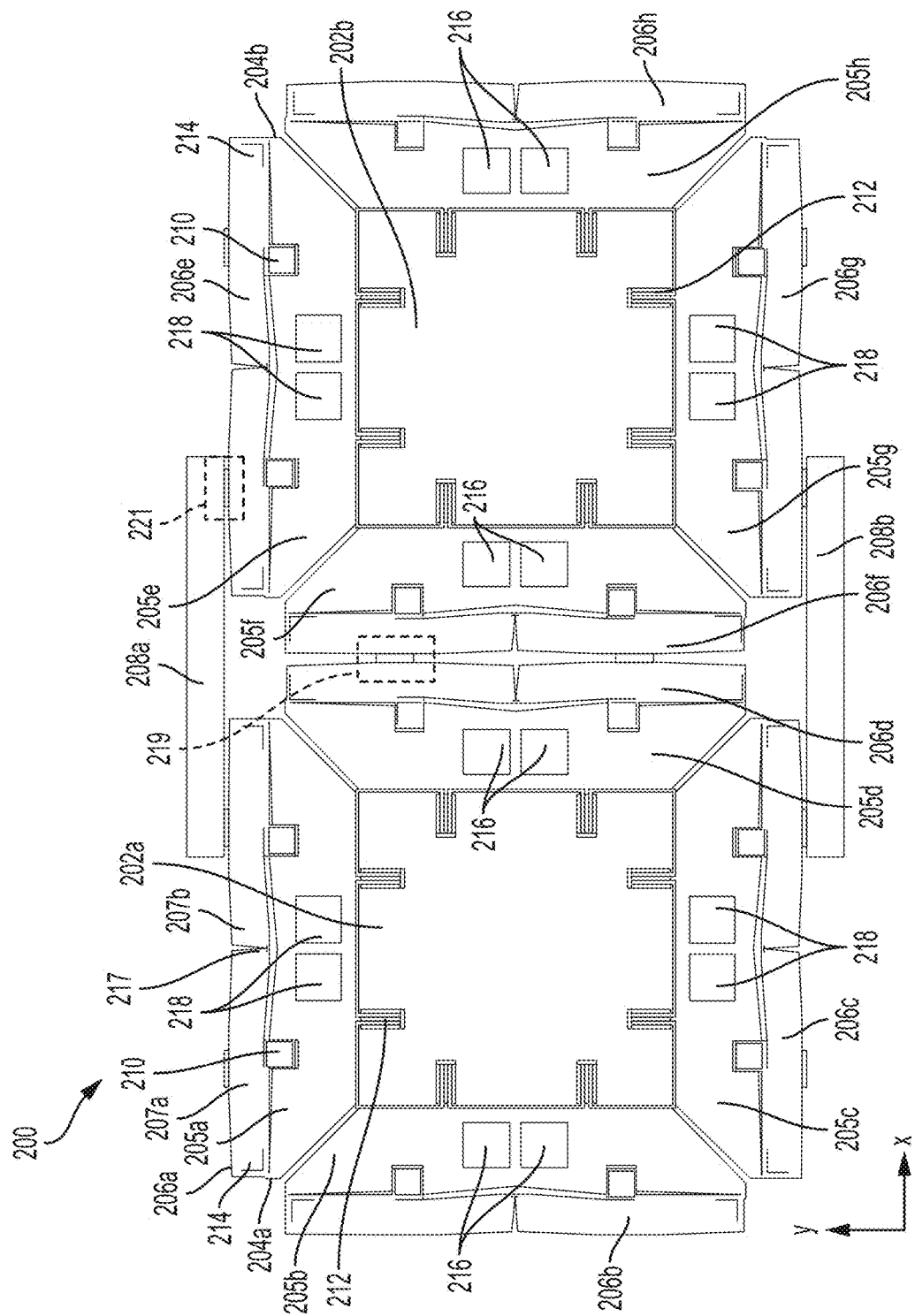
FIG. 2A illustrates a gyroscope having multiple proof masses coupled together by linearly moving runners, of the type illustrated in FIG. 1A.

As shown, the proof masses 102a and 102b are coupled to the substrate 104 by tethers 106a-106f, which may take any suitable form. A non-limiting example of a suitable tether structure is a folded tether, an example of which is described below in connection with FIG. 2B. The tethers allow for the proof masses 102a and 102b to move relative to the substrate 104. The proof masses may have two degrees of freedom, meaning they can generally move along at least two axes. This allows for the proof masses to operate in both a drive mode, in which they are actively driven by application of a suitable electrical signal, and a sense mode, in which they move in response to experiencing a condition, such as a Coriolis force (in the case of a gyroscope). The proof masses may also be configured to respond symmetrically with independent responses in the two degrees of freedom in response to acceleration (in the case of an accelerometer). As a non-limiting example, considering the situation in which the MEMS device 100 is a gyroscope, the proof masses 102a and 102b may be configured and coupled to the substrate 104 such that they may each move along both the x and y-axes. For example, the proof masses 102a and 102b may be driven along the x-axis and may move along the y-axis in response to rotation R of the MEMS device around a point 112. The tethers 106a-106f may have a suitable configuration to allow such motion. Moreover, alternative or additional tethers may be included to allow such motion. Thus, it should be appreciated that the illustration of tethers 106a-106f represents a generalization for coupling the proof masses 102a and 102b to the substrate 104, and that various tethering arrangements may be implemented in accordance with aspects of the present application. FIG. 2A, described below, provides one example of a suitable tethering arrangement.

The coupler 114 represents a generalization of a mechanism for coupling the proof masses 102a and 102b together. The coupler 114 may be a box spring connection, a straight beam connection, or other suitable coupler. Alternative proof mass-to-proof mass coupling schemes may be implemented, including the use of additional couplers. Some examples are described below in connection with FIG. 2A. The coupler 114 may be used in an attempt to provide synchronous motion of the proof masses 102a and 102b. An example of such motion is described below in connection with FIGS. 1B-1E.

The proof masses 102a and 102b are additionally coupled by runners 108a and 108b, which move, or translate, linearly when the proof masses 102a and 102b exhibit antisymmetric (or "anti-phase") motion in the y-direction. The runners are configured to move linearly in the directions illustrated by the arrows 110a and 110b, in this case the positive and negative x-direction. More specifically, the runners 108a and 108b constrain the proof masses 102a and 102b to linear anti-phase motion, themselves moving linearly as the proof masses 102a and 102b move in an anti-parallel fashion along the y-direction, but resist or inhibit motion in which the proof masses move in a parallel fashion along the y-direction. Thus, in at least some embodiments the linear motion of the runners is in a direction perpendicular to the corresponding motion of the proof masses. In the non-limiting situation in which the MEMS device 100 is a gyroscope, the y-direction may represent the drive or sense direction, and thus the runners 108a and 108b may constrain the proof masses to linear anti-phase motion in the drive or sense modes. As will be described further below, additional runners may be provided to ensure linear anti-phase motion in both drive and sense modes, and in at least some embodiments the combination of runners may ensure linear anti-phase motion in both drive and sense modes with zero net momentum.

The runners 108a and 108b move in opposite directions of each other in at least some embodiments. For example, when the runner 108a moves to the right along the direction of the x-axis, the runner 108b may move to the left along the direction of x-axis, and vice versa. This linear motion of the runners may be achieved by suitable configuration of the runner itself and/or the manner in which it is coupled to the proof masses. In some embodiments, the runners are rigid bars which are coupled to pivoting linkages which themselves are coupled to the proof masses 102a and 102b. The pivoting motion of the pivoting linkages may result in linear motion of the runners 108a and 108b. An example is described below in connection with FIG. 2A.

The runners 108a and 108b may be formed of any suitable material. In at least some embodiments, the runners 108a and 108b are formed of the same material as the proof masses 102a and 102b, and are formed from the substrate 104 by suitable micromachining (e.g., lithography and etching). The runners 108a and 108b may be substantially identical, including having substantially identical masses, to provide the MEMS device 100 with symmetry. The runners 108a and 108b may have lengths parallel to the x-axis and widths parallel to the y-axis, with the lengths being between two and 100 times greater than the widths (or any value within that range), as a non-limiting example.

While FIG. 1A illustrates in simplified form two runners 108a and 108b, it should be appreciated that more than two runners may be, and in some embodiments are, included. In some embodiments, more than two runners are provided on a given side of the proof masses 102a and 102b. The multiple runners on a given side may be configured to move in opposite directions of each other, providing a momentum balanced configuration. In some embodiments, multiple runners are included on multiple sides of an arrangement of proof masses, with an equal number of the runners moving in opposite directions to provide balanced motion, thus not imparting any net momentum to the MEMS device. An example is described below in connection with FIG. 1F.

It should be appreciated that the MEMS device 100 may optionally include features in addition to those illustrated, and that the nature of any such additional features may depend on the type of device (e.g., gyroscope, accelerometer, resonator). For example, one or more anchors may be included to anchor components such as the proof masses 102a and 102b to the substrate 104. Electrical features, including drive and sense electrodes, may be included and may assume any suitable form for providing drive and sense operation. Other features may also be included.

As described above, in at least some aspects of the present application a MEMS device (e.g., a gyroscope) may include multiple proof masses configured to exhibit synchronous, antisymmetric movement. For example, the proof masses 102a and 102b of gyroscope 100 may be coupled together to provide synchronous, antisymmetric motion. FIGS. 1B-1E illustrate state diagrams of such antisymmetric motion. In those figures, the x and y-axes have the same orientation as in FIG. 1A.

For purposes of explanation, it will be assumed that the MEMS device 100 is a gyroscope and that the x-axis represents the direction of the drive motion. That is, the proof masses 102a and 102b are driven along the x-axis. The y-axis will represent the direction of the response to rotation, and thus can be considered to be the sense axis in this example.

Figure 1B:
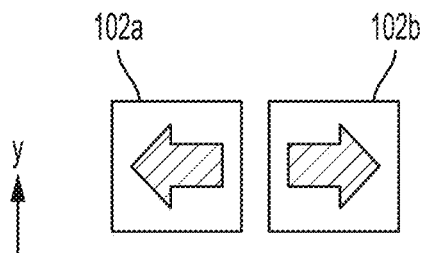
FIGS. 1B-1E illustrate four states of antisymmetric (or "anti-phase") operation of the MEMS device of FIG. 1A.
Figure 1C:
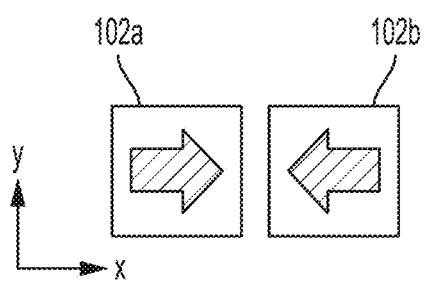

FIGS. 1B and 1C illustrate motion of the proof masses 102a and 102b in the drive mode, and show that the motion is antisymmetric. As shown in FIG. 1B, when the proof mass 102a moves to the left (in the negative x-direction), the proof mass 102b moves to the right (in the positive x-direction). As shown in FIG. 1C, when the proof mass 102a moves to the right (in the positive x-direction), the proof mass 102b moves to the left (in the negative x-direction). The motion may be synchronous in that motion of one of the proof masses may cause motion of the other.

Figure 1D:
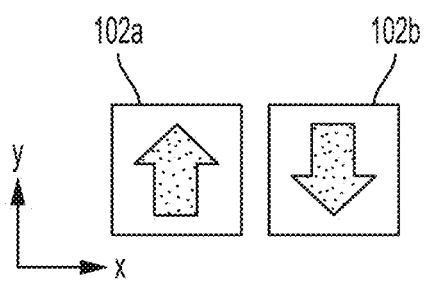
Figure 1E:
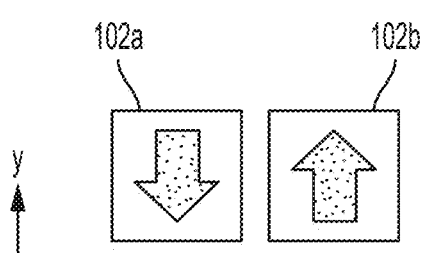

FIGS. 1D and 1E illustrate antisymmetric motion of the proof masses 102a and 102b in the sense mode. As shown in FIG. 1D, when the proof mass 102a moves up (in the positive y-direction), the proof mass 102b moves down (in the negative y-direction). As shown in FIG. 1E, when the proof mass 102a moves down (in the negative y-direction), the proof mass 102b moves up (in the positive y-direction). Again, the motion may be synchronous in that motion of one of the proof masses may cause motion of the other.

While FIGS. 1B-1E illustrate linear motion in the up-down and left-right directions, it should be appreciated that any combination of such motion may be implemented by a MEMS device. For example, the motion of the masses may instead be along a diagonal direction (e.g., at 45 degrees to the x and y-axes), among other possibilities. For example, the drive axis may be at 45° to the x-axis and the sense axis may be at 135° to the x-axis. Other orientations are possible. Also, while FIGS. 1B-1C are described as relating to a drive mode of operation and FIGS. 1D-1E a sense mode, it should be appreciated that the drive and sense directions may be reversed. In general, it should be appreciated that FIGS. 1B-1E merely represent an example of anti-phase motion which may be implemented by a MEMS device having two movable masses, and that the directions of motion and designation of drive and sense modes may take various forms. For example, the drive and sense modes may be reversed compared to those described.

The antisymmetric (or "anti-phase") motion illustrated in FIGS. 1B-1E may be desirable in at least some embodiments. The runners 108a and 108b are configured, in at least some embodiments, to constrain the proof masses to anti-phase motion along at least one of the axes (e.g., an axis perpendicular to the direction of motion of the runners). For example, the runners may enforce linear anti-phase motion of the proof masses in the drive mode, in the sense mode, or in both. This is achieved in some embodiments by making the runners resistant to symmetric motion. An example of a suitable runner configuration resistant to, and therefore inhibiting, such symmetric motion is illustrated in FIG. 2A and described further below.

Figure 1F:
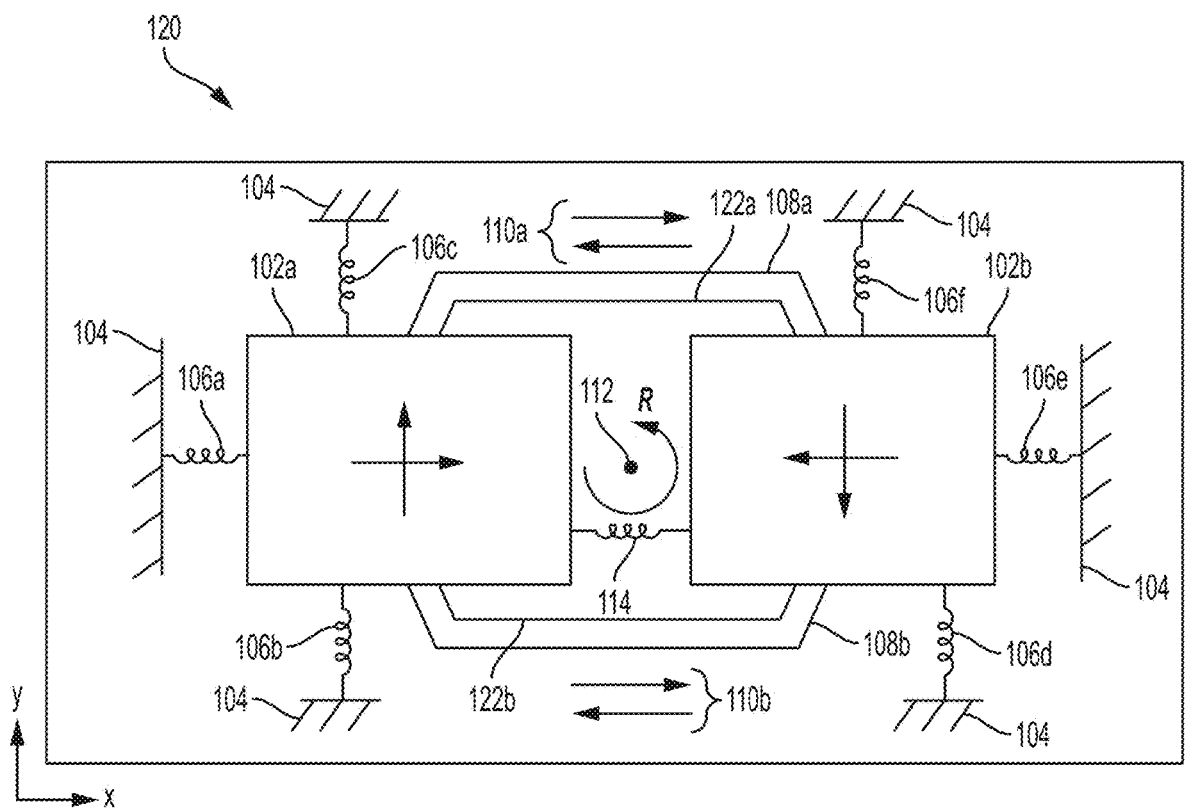
FIG. 1F is a block diagram representation of a gyroscope having multiple proof masses coupled together by linearly moving runners, including multiple oppositely-moving runners on a same side of the proof masses, according to an embodiment of the present application.

As described above, in some embodiments a MEMS device may include multiple runners on a single side of the coupled proof masses. Referring again to FIG. 1A, having the runners 108a and 108b move in opposite directions may provide the desired antisymmetric motion of the proof masses 102a and 102b, but may undesirably allow symmetric motion of the proof masses by providing a net linear momentum between runners. Thus, aspects of the present application provide gyroscopes having balanced runner configurations in which there is no net momentum or other form of imbalance resulting from the linear motion of the runners. FIG. 1F illustrates an example.

The MEMS device 120 of FIG. 1F, which may be any of the types of MEMS devices previously described, includes many of the same components as the MEMS device 100 of FIG. 1A, but differs in that there are multiple runners on the same sides of the proof masses 102a and 102b. That is, in addition to the runners 108a and 108b, runners 122a and 122b are included. Like runners 108a and 108b, runners 122a and 122b may be configured to move linearly, and may allow for, or enforce, antisymmetric motion of the proof masses 102a and 102b along the y-axis while preventing symmetric motion along the y-axis. Moreover, the runner 122a may be configured to move in an opposite direction to that of runner 108a, and runner 122b may be configured to move in an opposite direction to that of runner 108b. In this manner, there may be no net momentum imparted to the MEMS device 120 by the linear motion of the runners 108a, 108b, 122a, and 122b. Further still, the runners 122a and 122b may have masses substantially equal to each other, and substantially equal to those of runners 108a and 108b, thus providing a balanced configuration which does not have any net linear momentum associated with the linear motion of the runners because they have equal masses which move by equal amounts in opposite directions.

The runners 122a and 122b may be formed of the same material as runners 108a and 108b, and may be formed in substantially the same manner, for example being formed during the same lithography and etching steps as used to form the runners 108a and 108b.

FIG. 2A illustrates a gyroscope having multiple proof masses coupled together by linearly moving runners, of the type illustrated in FIG. 1A. While a gyroscope is shown and described, it will be appreciated that other types of MEMS devices may utilize the runners and structures illustrated therein, such as, but not limited to, resonators and accelerometers. The gyroscope 200 includes proof masses 202a and 202b coupled by linearly moving runners 208a and 208b. In addition, the gyroscope 200 includes shuttles 204a and 204b corresponding to proof masses 202a and 202b, respectively, and a number of pivoting linkages 206a-206h. Pivoting linkages 206a, 206b, 206c, and 206d correspond to proof mass 202a and pivoting linkages 206e, 206f, 206g, and 206h correspond to proof mass 202b. Moreover, the gyroscope includes tethers 212 coupling the proof masses 202a and 202b to the respective shuttles 204a and 204b. In this non-limiting example, there are eight tethers 212 coupling each of the proof masses to its respective shuttle. Anchors 210 support the pivoting linkages 206a-206h and hence the shuttles 204a and 204b, with the pivoting linkages and shuttles being connected by hinges 214. In this example, there are eight anchors 210 associated with each of the proof masses. Electrode regions 216 may include or accommodate electrodes for driving the proof masses 202a and 202b along the x-axis, and electrode regions 218 may include or accommodate electrodes for sensing motion of the proof masses 202a and 202b along the y-axis in response to rotation of the gyroscope in the plane of the page.

The shuttles 204a and 204b are movable, and are also optional. As shown, each of shuttles 204a and 204b is segmented in this non-limiting example. Stated another way, the illustrated shuttles may be considered multi-part shuttles, or likewise the shuttles 204a and 204b could each be considered four separate shuttles. For purposes of description, shuttle 204a is described herein as including four segments (or parts) 205a, 205b, 205c, and 205d. Shuttle 204b is described herein as including four segments (or parts) 205e, 205f, 205g, and 205h. Multi-part shuttles of this type allow for a portion (or part) of the shuttle to move in the drive mode and a different portion to move in the sense mode.

As described, the shuttles are optional. They may be included to suppress misalignment of the drive force and/or misalignment of the sense force by resisting motion orthogonal to the desired motion. However, not all embodiments include such shuttles. Some embodiments include proof masses, pivoting linkages, and runners, but not shuttles. The proof mass may be directly coupled to the pivoting linkage in such embodiments.

The pivoting linkages 206a-206h are included to reduce or entirely eliminate quadrature. Quadrature is the motion of the proof masses in the direction orthogonal to the drive motion, which is ideally 90° out of phase with the Coriolis response. Typically, quadrature is undesirable, as the gyroscope may be unable to distinguish between electrical signals resulting from quadrature as opposed to those resulting from rotation, and thus the accuracy of the gyroscope at detecting rotation may be negatively impacted by the occurrence of quadrature.

Each of the illustrated pivoting linkages includes two segments connected by a connector 217, an example of which is described below in connection with FIGS. 2E-1, 2E-2, and 2E-3. The two segments of the pivoting linkage may be of substantially equal length. In this state of operation, which corresponds to the state shown in FIG. 2A for all the pivoting linkages, the two segments of the pivoting linkage in combination form a substantially rigid bar at an equilibrium position. When a shuttle moves linearly away from a given pivoting linkage, the pivoting linkage may flex (or bend) because the connector may flex. However, the connector 217 may resist torsion and/or shear, thereby inhibiting tilt of the pivoting linkage and preventing rotation of the shuttle (and the mass connected to it). The pivoting linkage reduces or prevents entirely quadrature motion of the gyroscope by inhibiting unwanted rotation or tilt of the shuttle (and the mass connected to it), while allowing the desired linear motion.

The pivoting linkages are connected to anchors 210 at the pivot points and are hingedly connected to the shuttles by hinges 214. In this manner, the pivoting linkages may pivot about the anchors 210 in response to the shuttles 204a and 204b being driven as well as in response to the shuttles 204a and 204b moving as a result of experiencing a Coriolis force.

The non-limiting example of FIG. 2A illustrates a MEMS device which exhibits symmetry. Not all embodiments are limited in this respect.

Figure 2B:
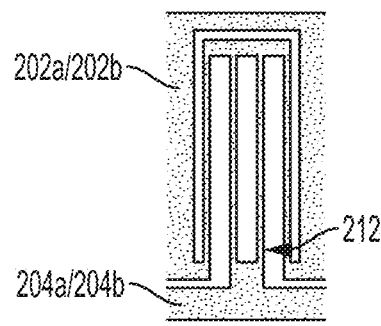
FIG. 2B is a close-up view of a tether of the type included in the gyroscope of FIG. 2A to couple a proof mass to a movable shuttle.

FIG. 2B illustrates a close-up view of the tether 212 of gyroscope 200 of FIG. 2A. In this non-limiting example, the tether 212 is a double folded tether, connecting at a single point to the shuttle 204a (or 204b) and at two points to the proof mass 202a (or 202b). The shape of the tether is not limiting, as various suitable tether configurations may be used to allow motion of the proof mass relative to the shuttle.

Figure 2C:
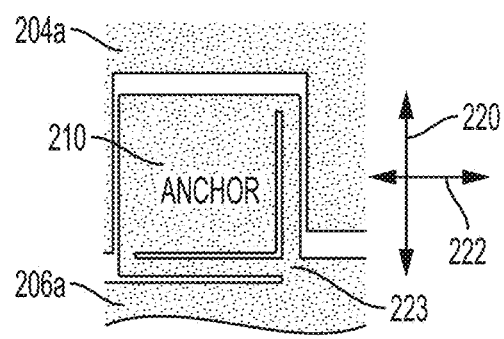
FIG. 2C is a close-up view of an anchor and pivot point of the type included in the gyroscope of FIG. 2A.

FIG. 2C is a close-up view of an anchor 210 and pivot point of the type included in the gyroscope of FIG. 2A. In this non-limiting example, the anchor 210 supports the pivoting linkage 206a at a pivot 223. The shuttle 204a has a shape generally conforming to the shape of the anchor 210, but is not directly or rigidly connected to the anchor 210, and thus is free to move relative to the anchor 210. Given the illustrated nesting arrangement of the anchor 210 and the shuttle 204a, it should be appreciated that the shuttle can move significantly more in the direction illustrated by arrow 220 than in the direction illustrated by the arrow 222. In some embodiments, the shuttle may be unable to move at all in the direction of arrow 222. The other anchors of the gyroscope 200 may have substantially the same construction and arrangement with respect to the pivoting linkages to which they connect.

Figure 2D:
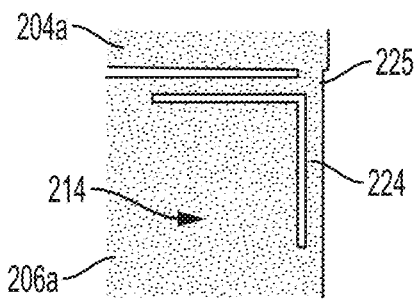
FIG. 2D is a close-up view of a hinge of the type included in the gyroscope of FIG. 2A.

FIG. 2D is a close-up view of a hinge of the type included in the gyroscope 200 of FIG. 2A. The hinge 214 includes an L-shaped flexural beam 224 in the pivoting linkage 206a (or other pivoting linkage of the gyroscope) allowing pivoting and preventing translation of the pivoting linkage segment relative to the pivot point 225. However, other configurations are possible. The pivoting linkage 206a connects to the shuttle 204a at a single corner 225 in this non-limiting example. According to an embodiment, all the hinges of the gyroscope 200 have substantially the same configuration.

Figures 1, 2E:
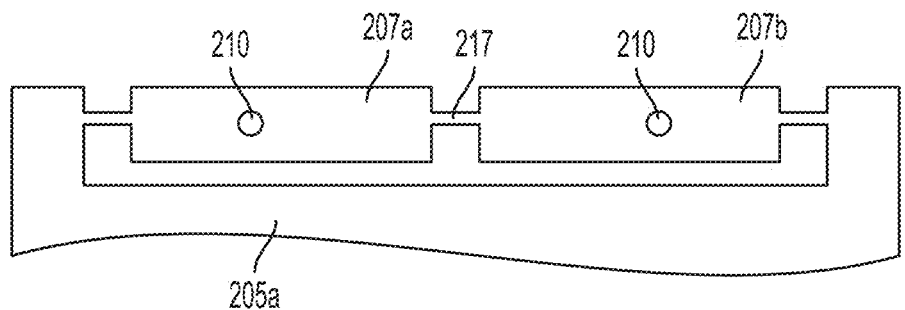
FIG. 2E-1 is a cartoon representation of a pivoting linkage of the type included in the gyroscope of FIG. 2A.
Figures 2, 2E:
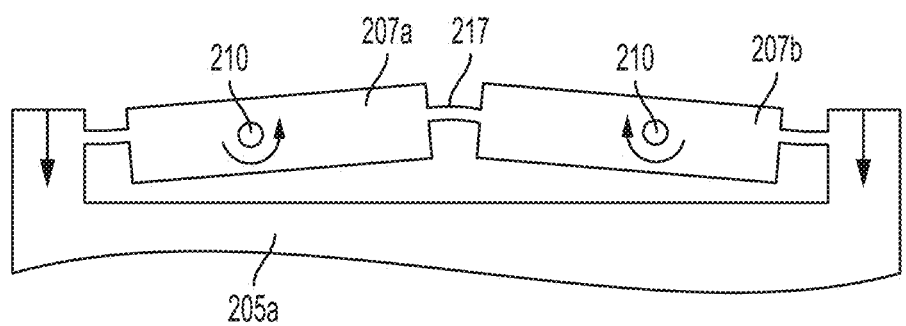
Figures 2, 2E, 3:
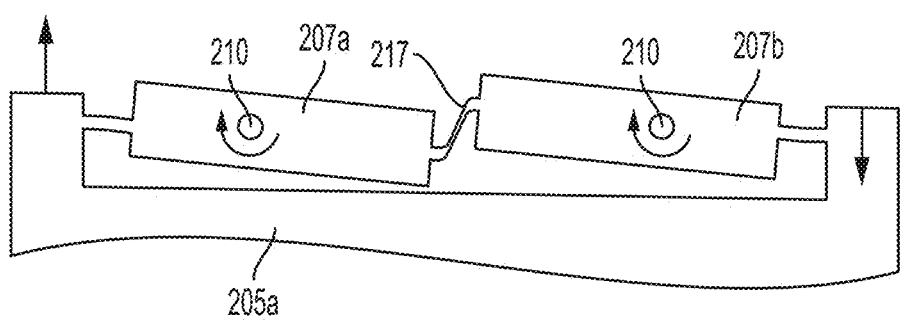

FIG. 2E-1 is a cartoon representation of a middle portion of a pivoting linkage, including a connector 217 of the type connecting the segments of a pivoting linkage, as may be employed by any and all of pivoting linkages 206a-206h. The connector 217 is illustrated in FIG. 2E-1 with respect to pivoting linkage 206a specifically, and the segments 207a and 207b, but the same configuration may apply to the other pivoting linkages of the gyroscope 200. The pivoting linkage 206a includes segments 207a and 207b. The connector 217 may be a relatively narrow and short beam coupling the two segments 207a and 207b together. The connector 217 may flex when the two segments 207a and 208b pivot in opposite directions about their respective pivot points at anchors 210, but may resist shear or torsion. Thus, the connector 217 may prevent pivoting of the two segments 207a and 207b in the same direction. FIGS. 2E-2 and 2E-3 illustrate allowed and rejected motion of the structure of FIG. 2E-1.

In FIG. 2E-2, the segments 207a and 207b pivot in opposite directions of each other around the pivot points supported by their respective anchors 210, as shown by the circular arrows. The connector 217 flexes to allow this pivoting. The illustrated state of deformation arises when the shuttle segment 205a translates downward in the figure.

FIG. 2E-3 illustrates deformation associated with the segments 207a and 207b pivoting in the same direction about their respective pivot points. As shown, this would correspond to the shuttle segment 205a exhibiting tilting motion, and would involve the connector 217 shearing. However, the connector resists this motion, and therefore the tilting illustrated in FIG. 2E-3 is prevented by the pivoting linkage configuration, including the connector 217. Thus, if the mass, or the shuttle, is attached to the oppositely pivoting segments (e.g., through hinges or other flexure types), the pivoting linkage system ensures linear motion of the mass (or the shuttle) and reduces unwanted rotation caused by two segments pivoting in the same direction. As a result, the pivoting linkage with the properly designed connector 217 may prevent unwanted quadrature motion.

Figures 1, 2F:
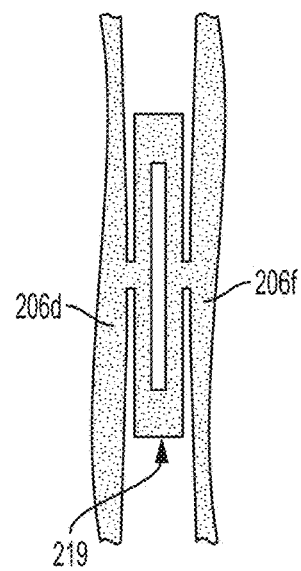
Figures 2, 2F:
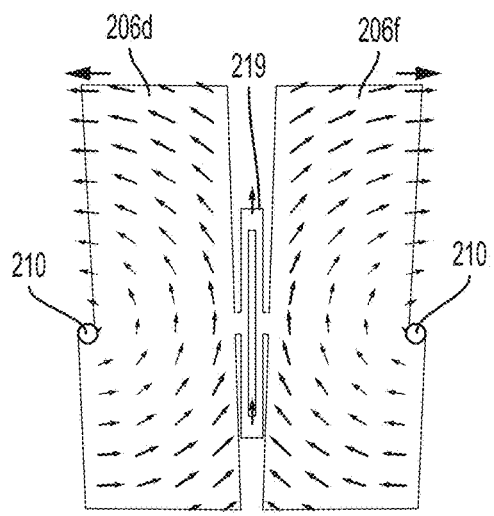
Figures 2, 2F, 3:
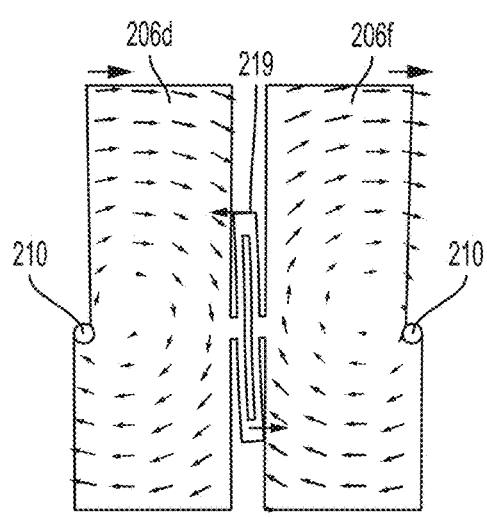

FIG. 2F-1 is a close-up view of a box spring connector 219 for coupling neighboring proof masses in the gyroscope of FIG. 2A. More specifically, the box spring connector 219, which is a non-limiting example of the coupler 114 of FIG. 1A, couples pivoting linkages of the neighboring proof masses, in this case pivoting linkages 206d and 206f. The box spring connector 219 may have any suitable size and shape. It may be positioned to allow the connected pivoting linkages 206d and 206f to rotate in opposite directions. The box spring may resist shear motion, thus preventing the pivoting linkages 206d and 206f from rotating in the same direction. In this manner, the pivoting linkages connected by the box spring may allow for or enforce anti-phase motion of the proof masses 202a and 202b while rejecting in-phase motion in the x-axis direction with respect to the arrangement of FIG. 2F-1. Examples of allowed and prevented motion are shows in FIGS. 2F-2 and 2F-3, respectively.

In FIG. 2F-2, the pivoting linkages 206d and 206f pivot in opposite directions as each other about the pivot points supported by their respective anchors 210. The box spring connector 219 allows such motion by stretching in the vertical direction of the figure. By contrast, FIG. 2F-3 illustrates a state in which the pivoting linkages 206d and 206f pivot in the same direction as each other about the pivot points supported by their respective anchors. To allow this motion, the box spring connector 219 would itself rotate counterclockwise, in the direction opposite to that in which pivoting linkages 206d and 206f pivot. The box spring 219 resists such motion, thus enforcing the desired motion of FIG. 2F-2.

The box spring connector 219 is a non-limiting example of a suitable connector for coupling the neighboring pivoting linkages of the gyroscope 200. As an alternative, a straight beam connector may be used.

Figure 2G:
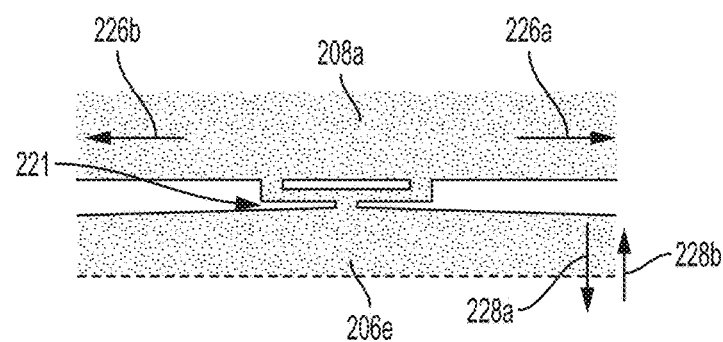
FIG. 2G is a close-up view of a coupler coupling the linear runners to a pivoting linkage of the gyroscope of FIG. 2A.

FIG. 2G is a close-up view of a coupler 221 coupling the runners to the shuttle of the gyroscope 200 of FIG. 2A. As shown, the coupler 221 may be a half-box spring connector. However, any suitable connector may be implemented which causes the runner 208a to move linearly in response to pivoting of the pivoting linkage 206e. That is, with respect to the arrangement of FIG. 2G, the coupler 221 causes the runner 208a to move to the right (arrow 226a) when the right side of the pivoting linkage moves down (arrow 228a), and causes the runner to move to the left (arrow 226b) when the right side of the pivoting linkage moves up (arrow 228b).

Referring again to FIG. 2A, in operation the gyroscope 200 may exhibit synchronous, anti-phase motion. When the shuttle segments 205b and 205d move to the right, in the positive x-direction, the upper segment of pivoting linkage 206b and the upper segment of pivoting linkage 206d pivot clockwise, while the lower segment of pivoting linkage 206b and the lower segment of pivoting linkage 206d pivot counterclockwise. The shuttle segments 205f and 205h will move to the left, in the negative x-direction. In particular, the upper segment of pivoting linkage 206f and the upper segment of pivoting linkage 206h will pivot counterclockwise, while the lower segment of pivoting linkage 206f and the lower segment of pivoting linkage 206h will pivot clockwise.

In the sense mode, in response to rotation of the gyroscope 200, when the shuttle segments 205a and 205c move downward, in the negative y-direction, the left segment of pivoting linkage 206a and the left segment of pivoting linkage 206c will pivot counterclockwise, while the right segment of pivoting linkage 206a and the right segment of pivoting linkage 206c will pivot clockwise. The shuttle segments 205e and 205g will move upward, in the positive y-direction, due to the runners 208a and 208b. The left segment of pivoting linkage 206e and the left segment of pivoting linkage 206g will pivot clockwise, and the right segment of the pivoting linkage 206e and the right segment of the pivoting linkage 206g will pivot counterclockwise. The runners 208a and 208b constrain the proof masses and shuttles to such motion. That is, runner 208a forces the right segment of pivoting linkage 206a and the left segment of pivoting linkage 206e to rotate in the same direction (clockwise or counterclockwise) by itself moving linearly to the right or left. Similarly, the runner 208b forces the right segment of pivoting linkage 206c and the left segment of pivoting linkage 206g to rotate in the same direction by itself moving linearly right or left, in the opposite direction of runner 208a. However, because the runners 208a and 208b may be rigid bars, or other rigid couplers, they prevent the coupled segments of the pivoting linkages from rotating in opposite directions. Thus, the runners 208a and 208b inhibit, or prevent entirely, in-phase motion of the shuttles 204a and 204b in the sense mode. Therefore, acceleration of a type which tends to induce in-phase motion of the shuttles 204a and 204b will not be detected. Accordingly, the runners 208a and 208b provide an acceleration insensitive gyroscope.

Figure 2H:
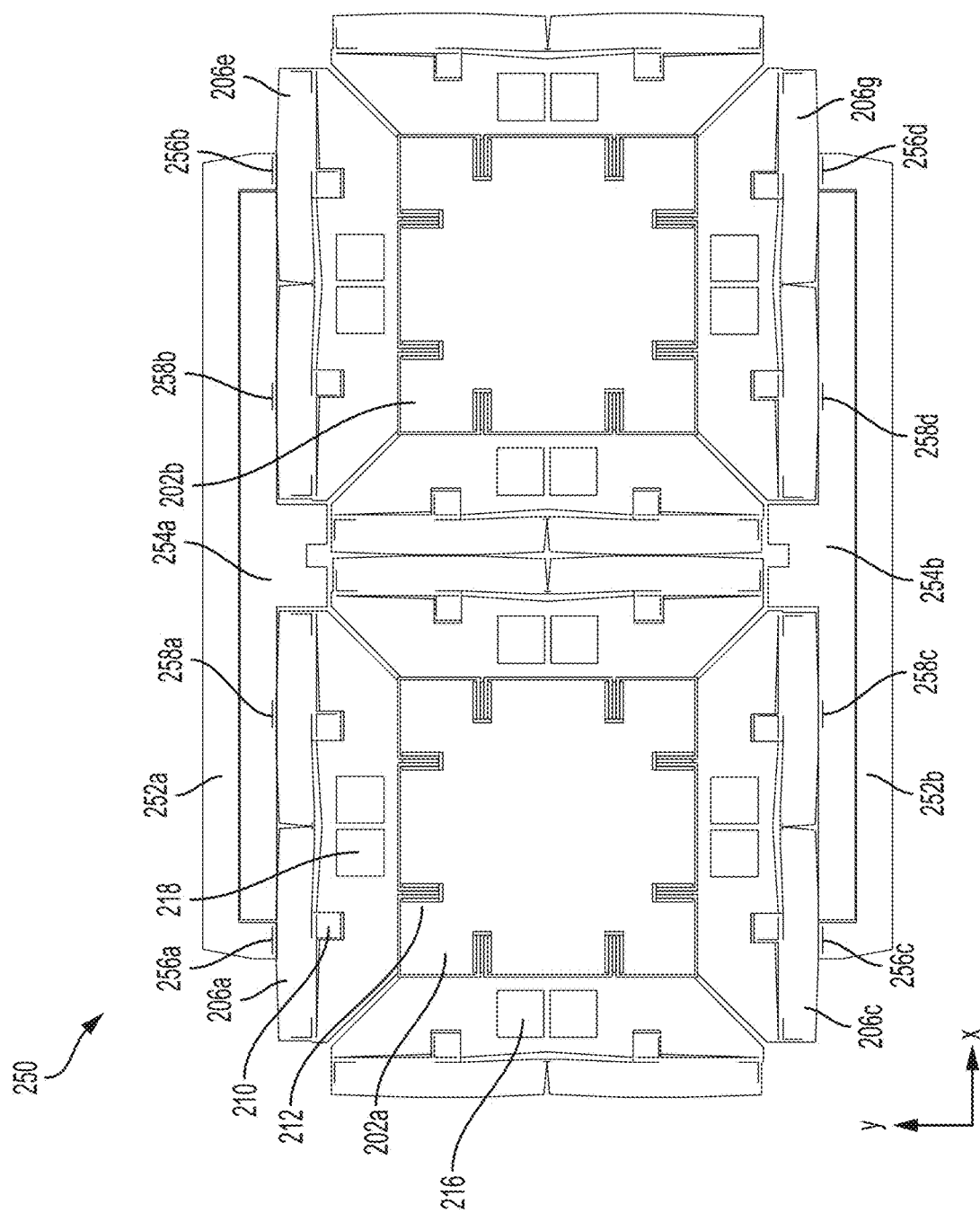
FIG. 2H illustrates a gyroscope having multiple proof masses coupled together by linearly moving runners, of the type illustrated in FIG. 1F.
Figure 21:
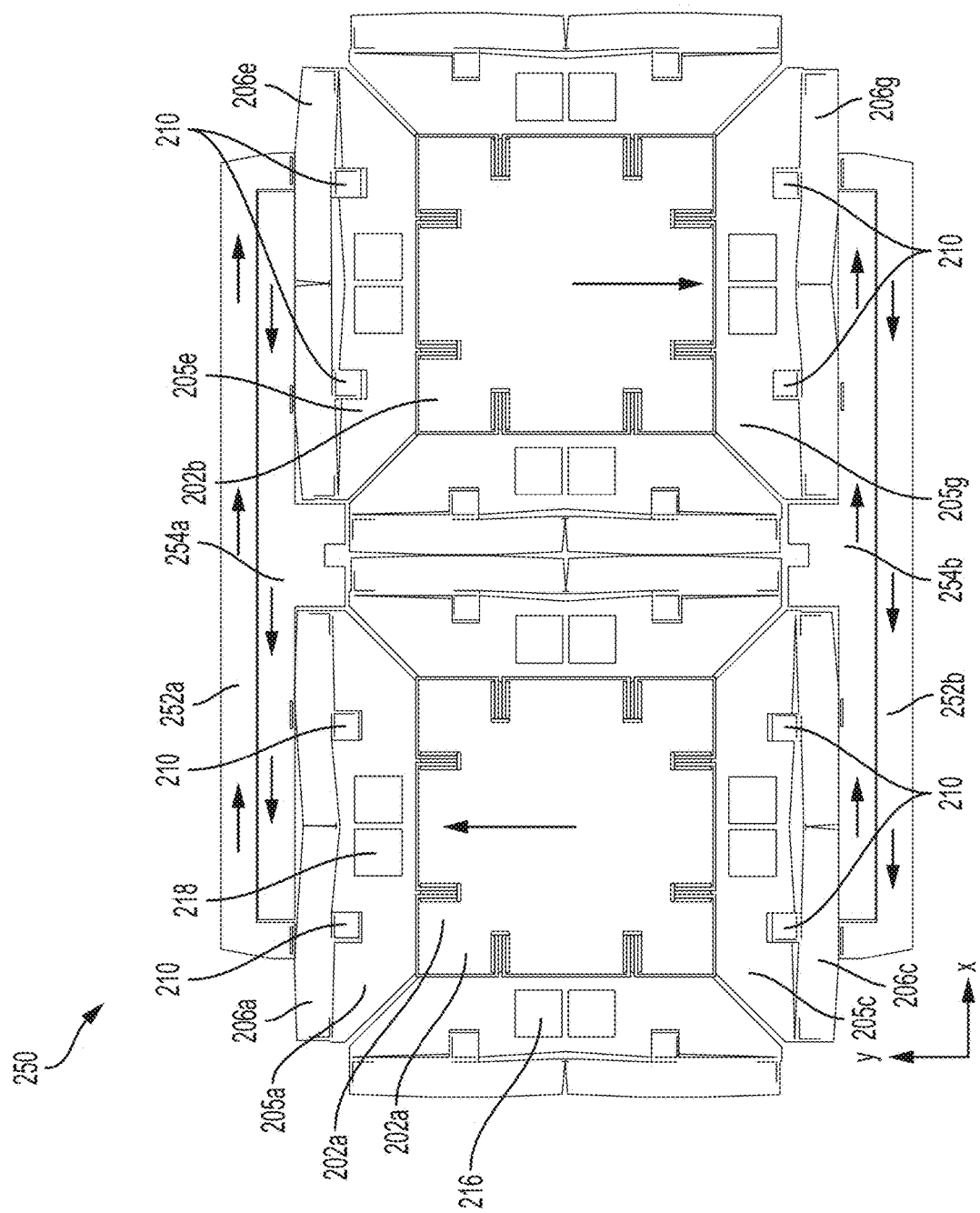

As described above in connection with FIG. 1F, in some embodiments a MEMS device, such as a MEMS gyroscope, may include a balanced runner configuration in which multiple runners are included on a same side of the coupled proof masses. FIG. 2H illustrates a non-limiting example of an implementation of such a gyroscope. The gyroscope 250 includes many of the same components already illustrated and described in connection with FIG. 2A, and thus they are not described again in detail here. However, the gyroscope 250 differs from the gyroscope 200 in that it includes a balanced runner configuration, with two runners, which move linearly, on each side of the coupled proof masses. In particular, the gyroscope 250 includes runners 252a, 252b, 254a, and 254b.

The runner 252a is coupled to left-most segment of pivoting linkage 206a by a coupler 256a, and to the right-most segment of the pivoting linkage 206e by a coupler 256b. Similarly, the runner 252b is coupled to the left-most segment of pivoting linkage 206c by a coupler 256c, and to the right-most segment of pivoting linkage 206g by the coupler 256d. The couplers 256a-256d may be the same as each other, and may be the type of coupler shown in FIG. 2G, or any other suitable coupler allowing for linear motion of the runners 252a and 252b in opposite directions as each other.

The runner 254a is coupled to the right-most segment of pivoting linkage 206a by a coupler 258a, and to the left-most segment of pivoting linkage 206e by coupler 258b. The runner 254b is coupled to the right-most segment of pivoting linkage 206c by a coupler 258c, and to the left-most segment of pivoting linkage 206g by a coupler 258d. The couplers 258a-258d may be the same as each other, and may be the type of coupler shown in FIG. 2G, or any other suitable coupler allowing for linear motion of the runners 254a and 254b in opposite directions as each other.

Because the runners 252a and 254a are coupled to different segments of the pivoting linkage 206a and 206e as each other, and because those different segments will rotate in opposite directions as each other, the runners 252a and 254a will move in opposite linear directions as each other during operation, which will be described further below in connection with FIG. 2I. Likewise, because the runners 252b and 254b are coupled to different segments of the pivoting linkage 206c and 206g as each other, and because those different segments will rotate in opposite directions as each other, the runners 252b and 254b will move in opposite linear directions as each other during operation. In total, then, the runners 252a and 252b will move in opposite directions as each other, and runners 254a and 254b will move in opposite directions as each other. Thus, there will be substantially no net linear momentum from the combination of runners 252a-252b and 254a-254b as long as their masses and velocities are equal, referred to as momentum balance. This then provides a balanced runner configuration which does not impart undesired in-phase (symmetric) motion of the proof masses.

The runners 252a and 252b are substantially identical to each other, as are the runners 254a and 254b. All four of the runners may have substantially the same mass, thus providing a balanced configuration. In the illustrated example, runners 252a and 252b are longer (in the x-direction) than are runners 254a and 254b. The runners 254a and 254b may be wider in the y-direction than runners 252a and 252b to provide substantially equal masses, or may have any other suitable configuration. It can be seen that in this example all four of the runners are longer in the x-direction than in the y-direction. The lengths in the x-direction may be between two and 100 times greater than the widths in the y-direction, or any value within that range. Alternative dimensions are possible.

It can also been seen from FIG. 2H that for the illustrated non-limiting example the runners 252a and 254a assume a nested configuration. The runner 254a is proximate the proof masses while the runner 252a is distal the proof masses. The same is true of the runners 254b and 252b, respectively. Other configurations are possible.

FIG. 2I illustrates one state of operation of the gyroscope 250 of FIG. 2H, and shows the balanced operation of the runners 252a, 252b, 254a, and 254b. In the illustrated state of operation, which may represent a state of the sense mode of operation, the proof mass 202a and the shuttle segments 205a and 205c move upward, in the positive y-direction. The proof mass 202b, and the shuttle segments 205e and 205g move downward, in the negative y-direction. The left-most segment of pivoting linkage 206a and the right-most segment of pivoting linkage 206e pivot clockwise about their respective pivot points, such that the runner 252a moves to the right, in the positive x-direction. The left-most segment of the pivoting linkage 206c and the right-most segment of pivoting linkage 206g pivot clockwise about their respective pivot points, such that the runner 252b moves to the left, in the negative x-direction, and therefore opposite the direction of the runner 252a.

The right-most segment of pivoting linkage 206a and the left-most segment of pivoting linkage 206e rotate counterclockwise about their respective pivot points, such that the runner 254a moves linearly to the left, in the negative x-direction. The right-most segment of pivoting linkage 206c and the left-most segment of pivoting linkage 206g rotate counterclockwise, such that the runner 254b moves linearly to the right, in the positive x-direction, and therefore opposite to the runner 254a. Thus, symmetric (in-phase) motion of the proof masses is rejected due to the runners.

Thus, it can be seen from the state of operation in FIG. 2I that a balanced runner configuration is provided in which the four runners move linearly but have a net momentum of zero. This, then, reduces the likelihood of imparting undesired motion to the gyroscope 250.

Figure 2J:
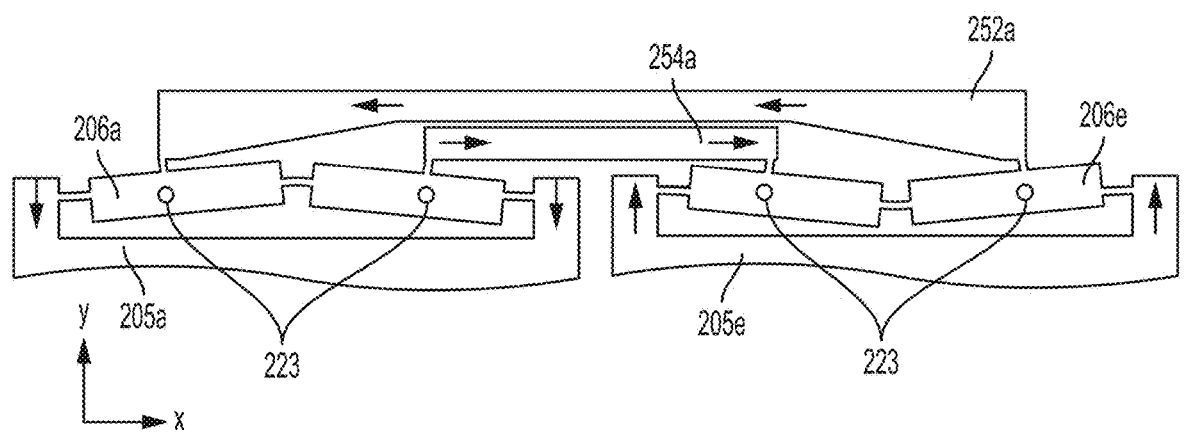
FIG. 2J is a cartoon representation of two of the balanced runners of the gyroscope of FIG. 2I, showing a state of deformation.

FIG. 2J illustrates a close-up cartoon representation of a portion of the gyroscope 250, providing another illustration of the motion of the runners. In particular, FIG. 2I illustrates a state of operation in which the shuttle segment 205a moves downward, in the negative y-direction, and the shuttle segment 205e moves upward, in the positive y-direction. It can be seen that the left-most segment of pivoting linkage 206a and the right-most segment of pivoting linkage 206e pivot counterclockwise, such that the runner 252a moves linearly to the left, in the negative x-direction. The right-most segment of pivoting linkage 206a and the left-most segment of pivoting linkage 206e pivot clockwise, such that the runner 254a moves linearly to the right, in the positive x-direction.

Figure 2K:
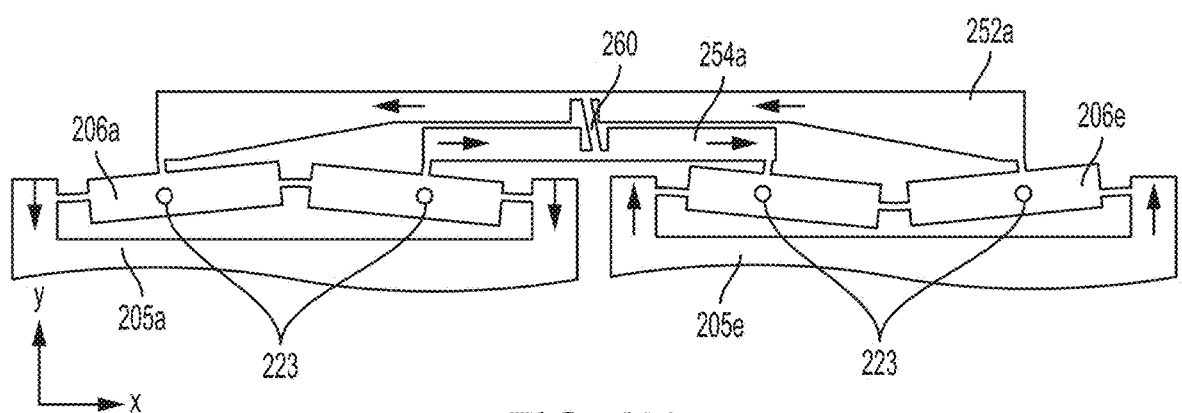
FIG. 2K illustrates an alternative to the configuration of FIG. 2J in which the balanced runners of a gyroscope are coupled together by a linkage substantially perpendicular to the lengths of the runners.

In some embodiments, multiple runners on a same side of coupled proof masses of a gyroscope may be coupled together. FIG. 2K illustrates a non-limiting example, showing a variation on the configuration of FIG. 2J. In FIG. 2K, the runners 252a and 254a are coupled by a coupler, or linkage, 260. The coupler 260 may be oriented generally perpendicular to both runners 252a and 254a and may have a length selected to provide a desired degree of flexibility/rigidity. The coupler 260 may be relatively short compared to the lengths of the runners in the x-direction in some embodiments, although not all embodiments are limited in this respect.

While FIGS. 2H-2K illustrate examples in which multiple runners are arranged next to each other on a side of coupled proof masses, other configurations for providing balanced runners are possible. According to some embodiments, multiple runners are arranged linearly on a side of coupled proof masses. The multiple runners may be constrained on multiple sides. An example is shown in FIG. 2L.

Figure 2L:
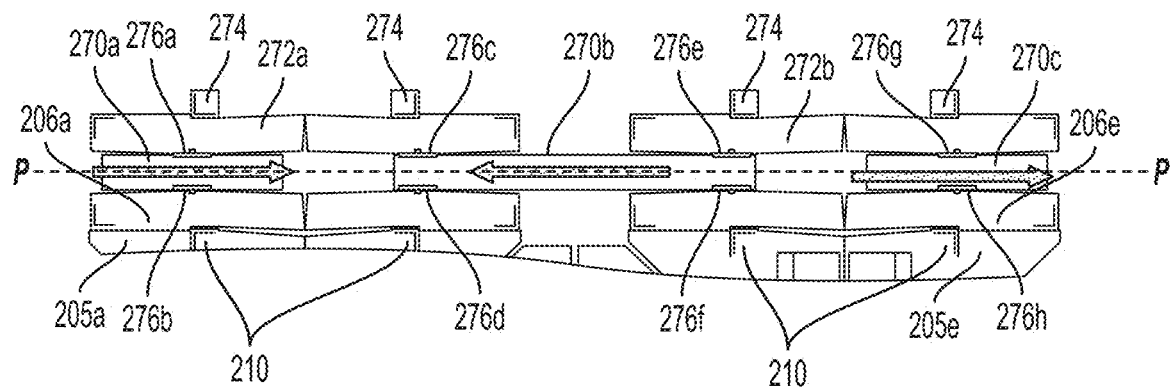
FIG. 2L illustrates an alternative runner configuration to that shown in FIG. 2H, in which multiple linearly-arranged runners are constrained on their inner and outer edges.

FIG. 2L shows a partial view of a gyroscope having multiple linearly-arranged runners as an alternative to runners 252a and 254a. The partial view shows part of shuttle segments 205a and 205e, previously described, but omits the remainder of the shuttles and proof masses for simplicity of illustration. Some of the components have been described previously in connection with other embodiments, and thus are not described in detail here. As shown, the device may include multiple linearly-arranged runners 270a, 270b, and 270c, arranged along a common axis (or line) P-P. In addition, pivoting linkages 272a and 272b are included and coupled to opposite sides of the runners 270a-270c as are the pivoting linkages 206a and 206e. The pivoting linkages 272a and 272b may be the same type of pivoting linkages as pivoting linkages 206a and 206e, and may be coupled to anchors 274 in the same manner as pivoting linkages 206a and 206e couple to anchors 210. The anchors 274 and 210 have the same construction in some embodiments, including pivots as previously described in connection with anchors 210.

The runner 270a may be coupled on one side to pivoting linkage 272a by a coupler 276a, and on the other side to pivoting linkage 206a by a coupler 276b. The runner 270b may be coupled on one side to pivoting linkage 272a by a coupler 276c, and on the other side to pivoting linkage 206a by a coupler 276d. Runner 270b may also be coupled on one side to pivoting linkage 272b by a coupler 276e and on the other side to pivoting linkage 206e by a coupler 276f. Runner 270c may be coupled on one side to pivoting linkage 272b by a coupler 276g and on the other side to pivoting linkage 206e by coupler 276h. The couplers 276a-276h may be of the type illustrated and described previously in connection with FIG. 2G, or may be any other suitable type of coupler providing linear motion of the runners 270a-270c in response to pivoting of the pivoting linkages 206a, 206e, 272a, and 272b.

In operation, the runners 270a and 270c move in an opposite direction to that of runner 270b. The runners 270a and 270c may have a combined mass substantially equal that of runner 270b, thus providing a balanced configuration in which the net linear momentum of the runners is zero, and therefore the runners do not impart undesired motion to the shuttles and/or proof masses. Therefore, in some embodiments the runners 270a and 270c are shorter than the runner 270b. In some such embodiments, the runners 270a and 270c have lengths equal to approximately half the length of the runner 270b.

It should be appreciated that while FIG. 2L illustrates a partial view of a gyroscope, the linearly-arranged runners may be mirrored on the opposite sides of the shuttles and proof masses of the gyroscope. That is, the runners 252b and 254b in FIG. 2I may be replaced with a configuration like that of FIG. 2L.

The runners 270a-270c force antisymmetric motion of the shuttle segments 205a and 205e in the sense mode of operation, and prevent symmetric motion. Thus, gyroscopes (or other MEMS devices) implementing the runner configuration of FIG. 2L may exhibit reduced acceleration sensitivity compared to gyroscopes lacking such runners.

Figure 2M:
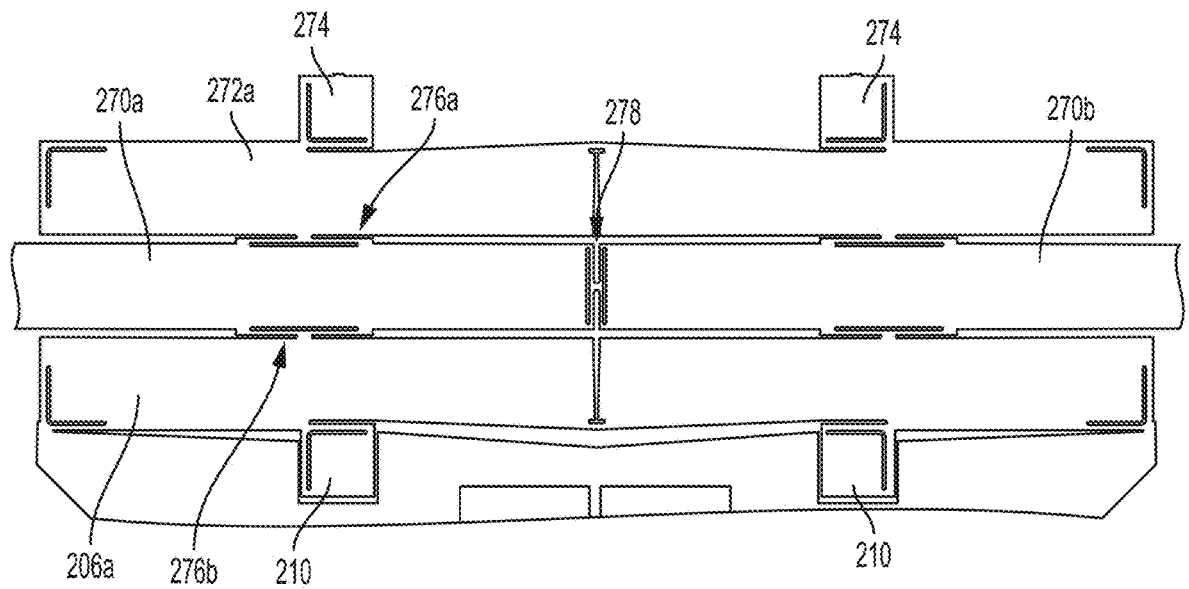
FIG. 2M illustrates an alternative to the configuration of FIG. 2L, in which multiple linearly-arranged runners are directly coupled to each other.

FIG. 2M illustrates an alternative to the configuration of FIG. 2L, in which the runners are directly connected to each other. Only part of the structure of FIG. 2L is shown, focusing on the connection between runner 270a and 270b. As shown, those two runners may be connected together at their adjacent ends by a coupler 278. The coupler 278 is illustrated as including a T-connection at the end of each of runners 270a and 270b, but alternative coupling configurations are possible. The coupler 278 is flexural, allowing runners 270a and 270b to move relative to each other. Likewise, runners 270b and 270c may be directly coupled to each other in the same manner, although they are not shown in FIG. 2M.

Figure 2N:
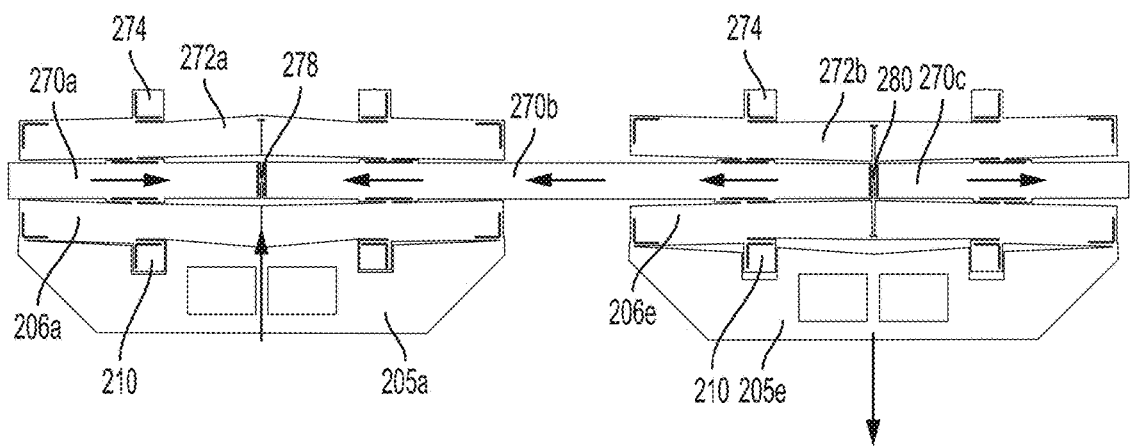
FIG. 2N illustrates a state of deformation of a structure like that shown in FIG. 2M.

FIG. 2N illustrates a state of deformation of a structure of the type illustrated in FIG. 2M. In this figure, more of the components from FIG. 2L are reproduced than are shown in FIG. 2M. For example, shuttle segment 205e, pivoting linkage 206e, runner 270c, and pivoting linkage 272b are additionally illustrated. The runners 270b and 270c are directly coupled together at adjacent ends by a coupler 280 which may be of the same type as coupler 278 described in connection with FIG. 2M.

In FIG. 2N it is seen that when the shuttle segments 205a and 205e move in linear anti-phase motion (here, the shuttle segment 205a moves linearly upward in the figure while shuttle segment 205e moves linearly downward), the runners 270a and 270c move linearly in the same direction (to the right in this example) as each other and in an opposite direction to runner 270b (which moves leftward in this figure). The couplers 278 and 280 may flex, allowing such motion.

The configurations of FIGS. 2L, 2M, and 2N may be said to illustrate a MEMS device (e.g., a gyroscope) with constrained runners. The runners 270a-270c are constrained on two, opposite sides (proximate and distal the proof masses/shuttles) along their length. This is in contrast to the configuration of FIG. 2H in which the runners are coupled to pivoting linkages on a single side along their length.

As described above, use of two or more proof masses in a MEMS device, such as a MEMS gyroscope can have certain advantages. The use of four proof masses may provide reduced sensitivity to vibration rectification (or g×g sensitivity) and linear acceleration (or g sensitivity) by mechanical cancellation of common mode signals. The use of four proof masses may also provide zero momentum imbalance, which can in turn reduce sensitivity to package modes, thereby eliminating cross-talk between multiple gyroscope cores. The geometric symmetry of using four proof masses may also allow a gyroscope to be used in mode-matched operation, which improves the signal-to-noise ratio (SNR), as well as allowing for self-calibration of the gyroscope on-the-fly (without interrupting its normal operation). Thus, scale-factor and offset stability may be improved, and recalibration using a shaker or rate table in the laboratory may be avoided. To realize such benefits, the four masses may be mechanically coupled to ensure synchronous motion. Moreover, use of linearly moving couplers of the types described herein may facilitate enforcing anti-phase motion of the four proof masses while resisting unwanted translation motion which is sensitive to vibrations (e.g., in phase motion).

Thus, aspects of the present application use linearly moving couplers of the types described herein to couple together four proof masses to form a synchronized mass gyroscope. The architectural challenge for MEMS gyroscopes is to preserve two degrees of freedom, since gyroscope operation uses both the resonator mode (drive-mode) and the Coriolis sensitive mode (sense-mode). The synchronized mass gyroscopes described herein may include linearly moving couplers which enforce linear anti-phase motion of the four coupled proof masses in the drive mode, the sense mode, or both, without causing interference between the two. Further still, the couplers are arranged to provide no net momentum, in at least some embodiments.

Figure 3A:
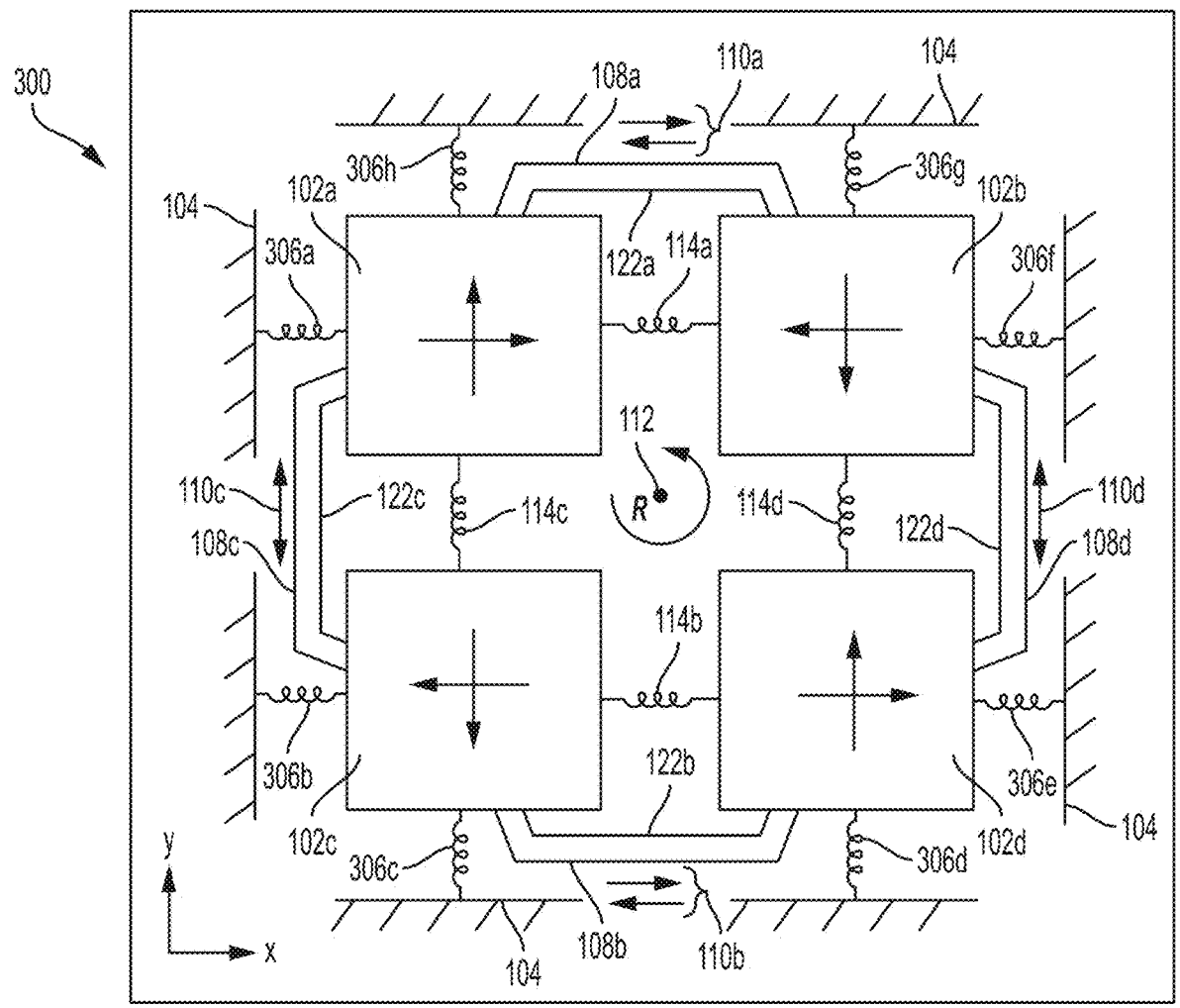
FIG. 3A is a block diagram representation of a MEMS device having four proof masses coupled together by linearly moving runners.

FIG. 3A illustrates in simplified form a MEMS device according to an aspect of the present application, having four proof masses coupled by runners of the types previously described herein, configured to resist (or inhibit) symmetric motion of each neighboring pair of the proof masses and allow or enforce linear anti-phase motion of the proof masses. The MEMS device 300 represents an extension of the MEMS device 100 of FIG. 1A, with the addition of two proof masses 102c and 102d, and various couplers providing coupling of the four proof masses. More specifically, the MEMS device 300 includes the first proof mass 102a and second proof mass 102b, a third proof mass 102c, a fourth proof mass 102d, the substrate 104, tethers 306a-306h, runners 108a, 108b, 108c, 108d, 122a, 122b, 122c, and 112d, and couplers 114a, 114b, 114c, and 114d. The tethers 306a-306h may be the same type as described previously in connection with tethers 106a-106f, or any other suitable type. The couplers 114a-114d may be the same type as coupler 114 described previously in connection with FIG. 1A, or any other suitable type. The runners 108a-108d and 122a-122d may be any of the types of runners described herein.

The runners 108a-108d and 122a-122d may enforce linear anti-phase motion of the proof masses 102a-102d parallel to the x and y-directions. For example, the runners 108a, 108b, 122a, and 122b may enforce linear anti-phase motion of the proof masses 102a-102d parallel to the y-direction. The runners 108c, 108d, 122c, and 122 may enforce linear anti-phase motion of the proof masses 102a-102d parallel to the x-direction. However, the motion of the proof masses along the x and y-directions may be decoupled from each other.

FIG. 3A illustrates that in some embodiments a gyroscope having a proof mass arrangement including four proof masses may include linearly moving balanced runners on opposite sides of the arrangement. The runners may move in the directions indicated by the arrows 110a, 110b, 110c, and 110d, as illustrated. Momentum balanced operation may be realized by properly selecting the masses such that the combined momenta of the individual masses are offset. For example, runners 108a, 122a, 108b, and 122b may have substantially equal masses and may be arranged to translate in opposite directions (e.g., 108a opposite 122a, and 108b opposite 122b) such that they move with equal and opposite momenta, and therefore cancel each other out. However, it should be appreciated that not all embodiments are limited in this respect, as a MEMS gyroscope according to alternative embodiments may have four masses coupled by runners of the types described herein which are momentum imbalanced. For example, in one embodiment a MEMS gyroscope may omit the runners 122a-122d.

Figures 3B, 3C:
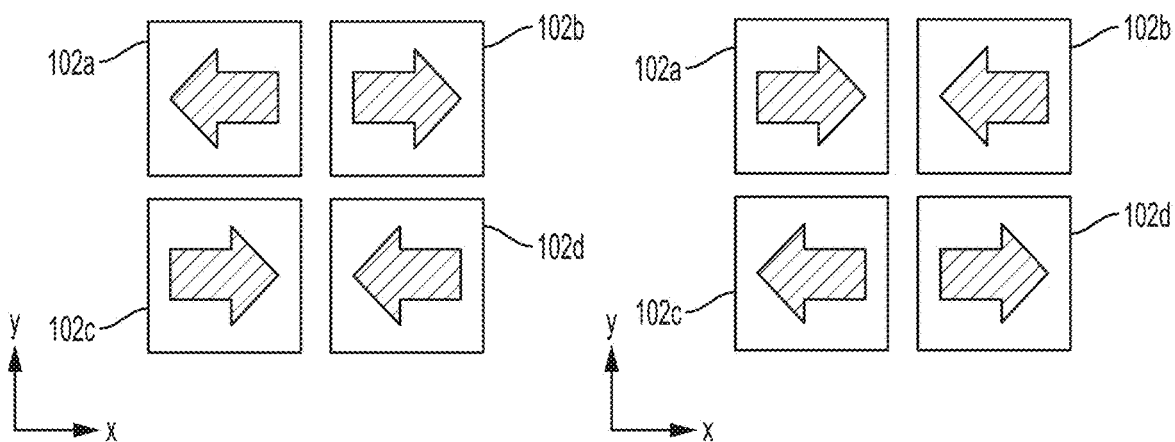
FIGS. 3B-3E illustrate four states of antisymmetric operation of the MEMS device of FIG. 3A.

FIGS. 3B-3E illustrate in block diagram form different states of anti-phase motion of the proof masses 102a-102d of FIG. 3A according to a non-limiting embodiment. For purposes of discussion, it is assumed that the MEMS device 300 is a gyroscope having both drive and sense modes. FIG. 3B illustrates in block diagram form a first state of linear anti-phase motion of the proof masses 102a-102d in a drive mode of operation, according to a non-limiting embodiment. As illustrated, the motion of proof masses 102a-102d is anti-phase in that the motion of any given mass of the four is in an opposite direction to that of the two direct neighboring masses. In the illustrated non-limiting example, proof masses 102a and 102d move linearly in the negative x-direction while proof masses 102b and 102c move linearly in the positive x-direction. The motion may be synchronous in that motion of one of the proof masses may cause motion of the others.

FIG. 3C illustrates a second state of the anti-phase motion of the drive mode. In this state, the proof masses 102a-102d have reversed direction compared to FIG. 3B. The proof masses 102a and 102d move linearly in the x-direction while proof masses 102b and 102c move linearly in the negative x-direction.

Figures 3D, 3E:
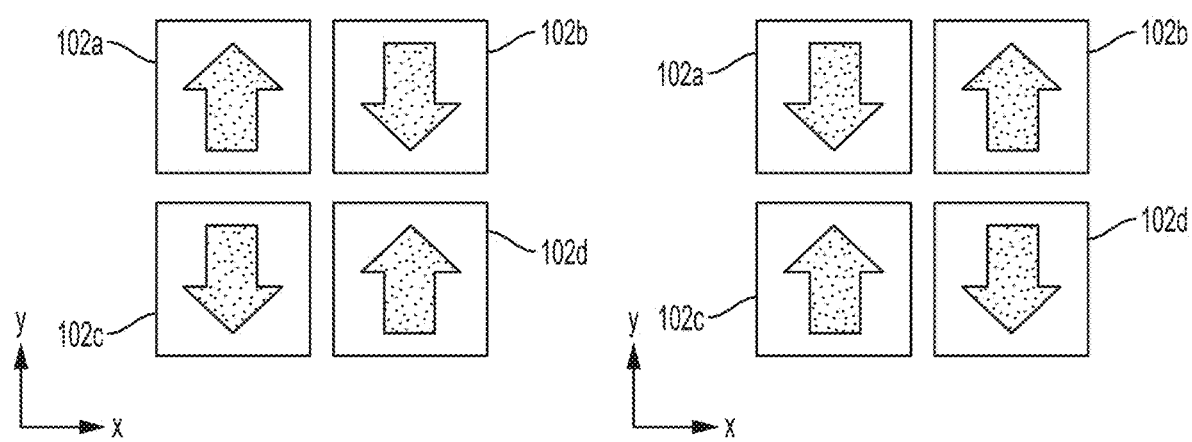

FIG. 3D illustrates a state of anti-phase motion of the proof masses 102a-102d in a sense mode of operation, according to a non-limiting embodiment. In this non-limiting example, proof masses 102a and 102d move linearly in the y-direction while proof masses 102b and 102c move linearly in the negative y-direction. Again, the motion may be synchronous in that motion of one of the proof masses may cause motion of the others.

FIG. 3E illustrates a second state of the anti-phase motion of the sense mode. In this state, the proof masses 102a and 102d move linearly in the negative y-direction while the proof masses 102b and 102c move in the y-direction.

While FIGS. 3B-3E illustrate linear motion of the proof masses in the up-down and left-right directions, it should be appreciated that any combination of such motion may be implemented by a MEMS device. For example, the motion of the proof masses may instead be along a diagonal direction (e.g., at 45 degrees to the x and y-axes), among other possibilities. For example, the drive axis may be at 45° to the x-axis and the sense axis may be at 135° to the x-axis. Other orientations are possible. Also, while FIGS. 3B-3C are described as relating to a drive mode of operation and FIGS. 3D-3E a sense mode, it should be appreciated that the drive and sense directions may be reversed. In general, it should be appreciated that FIGS. 3B-3E merely represent an example of linear anti-phase motion which may be implemented by a MEMS device having four movable masses, and that the directions of motion and designation of drive and sense modes may take various forms.

The runners 108a-108d and 122a-122d prioritize anti-phase motion of the proof masses 102a-102d, while rejecting spurious modes which can be excited by linear acceleration and angular acceleration. Specifically, the runners 108a-108b and 122a-122d prioritize anti-phase motion in the y-direction while runners 108c-108d and 122c-122d prioritize anti-phase motion in the x-direction. In doing so, the MEMS device 300 may be substantially insensitive or immune to linear acceleration and angular acceleration, thus providing more accurate operation of the MEMS device as a gyroscope. The runners may enforce the linear anti-phase motion by mode ordering the modes of the MEMS device such that those modes susceptible to external forces are at significantly higher frequencies than the desired modes of operation. In this manner, spurious modes may be rejected.

Figure 4A:
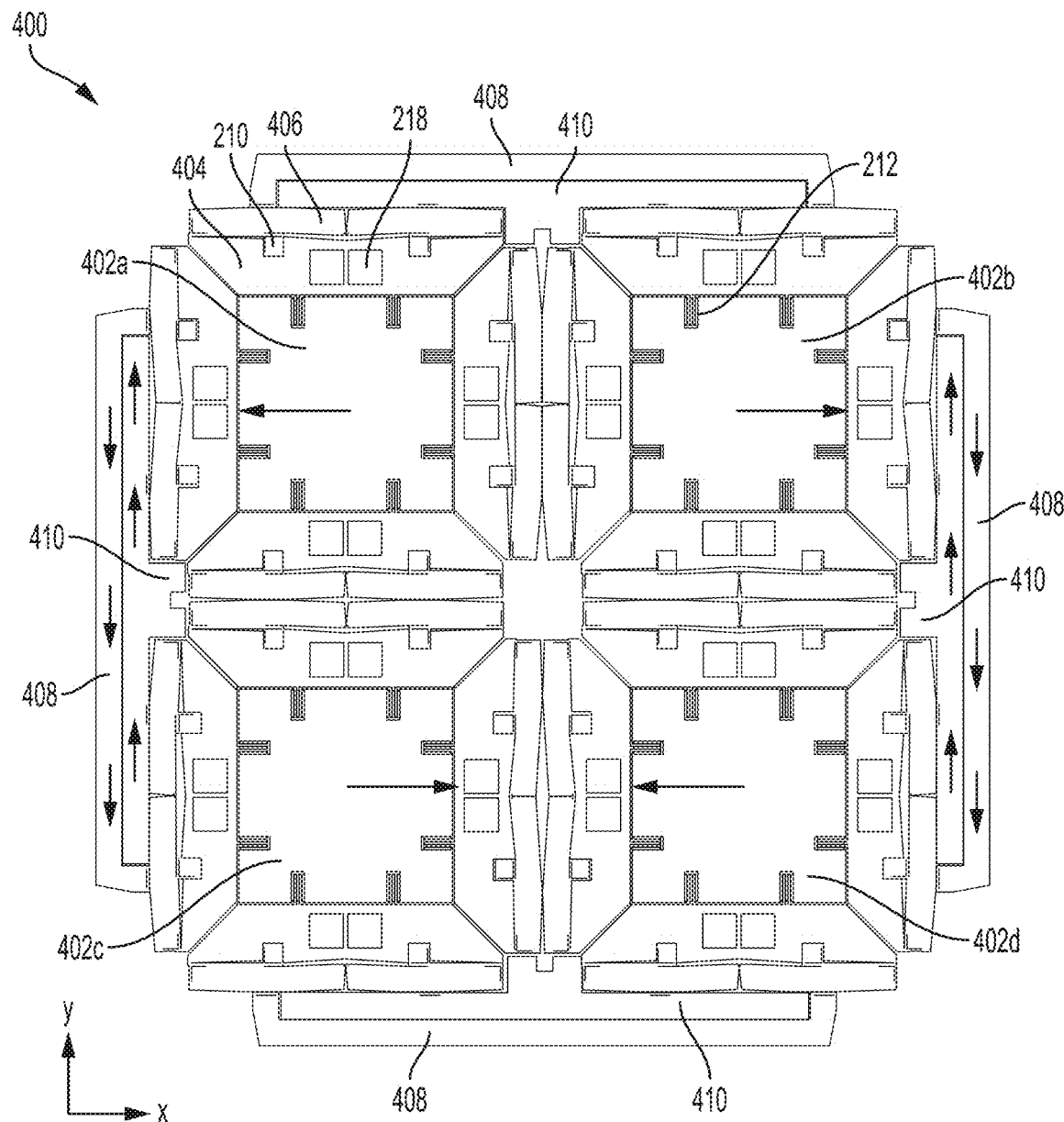
FIG. 4A illustrates a first state of deformation of a MEMS gyroscope having a proof mass arrangement of four coupled proof masses and linearly moving runners coupling the proof masses.
Figure 4B:
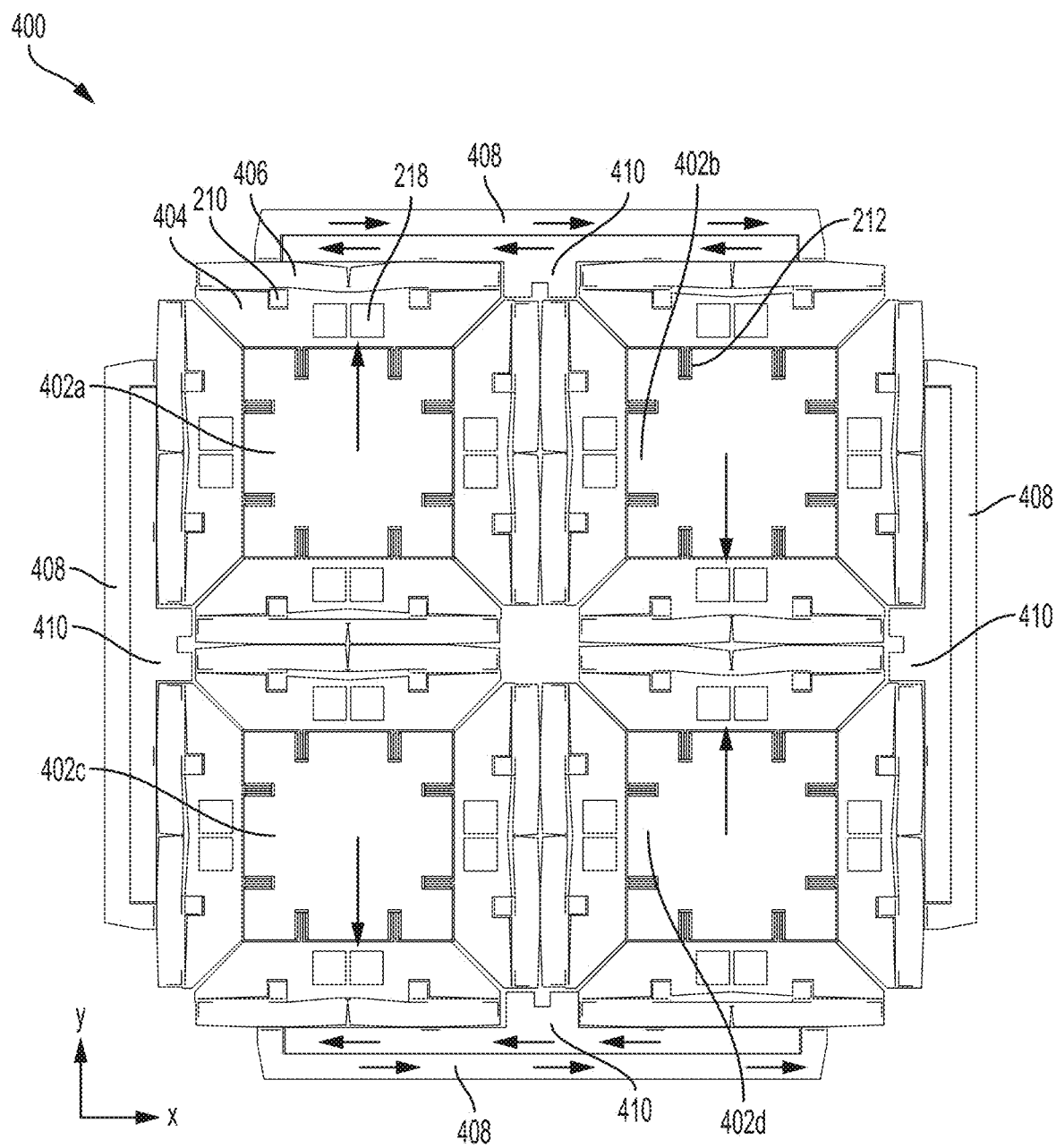
FIG. 4B illustrates a second state of deformation of the MEMS gyroscope of FIG. 4A.

FIGS. 4A-4B illustrate an example of a four-proof-mass synchronized mass gyroscope in two states of deformation, according to a non-limiting embodiment. FIG. 4A illustrates a state of deformation for which the proof masses of the MEMS gyroscope 400 undergo linear anti-phase motion parallel to the x-axis, while FIG. 4B illustrates a state of deformation for which the proof masses of the MEMS gyroscope 400 undergo linear anti-phase motion parallel to the y-axis.

The synchronized mass MEMS gyroscope 400 includes proof masses 402a-402d coupled to respective shuttles 404. Four pivoting linkages 406 are provided for each of the four proof masses. A total of eight runners are provided, including four runners 408 and four runners 410. The runners 408 are of the type described previously in connection with runners 252a and 252b, and runners 410 are of the type described previously in connection with runners 254a and 254b.

In FIG. 4A, the synchronized mass MEMS gyroscope is deformed in connection with linear anti-phase motion of the proof masses 402a-402d parallel to the x-axis. Specifically, proof masses 402a and 402d are displaced in the negative x-direction from their equilibrium positions and proof masses 402b and 402c are displaced in the x-direction. This motion may be associated with a drive mode of operation of the MEMS gyroscope, as a non-limiting example. In this state, the runners 408 and 410 on the left and right sides of the proof mass arrangement are displaced in the directions indicated by the bold arrows. Specifically, the runners 408 coupling proof mass 402a with 402c and proof mass 402b with 402d are displaced in the negative y-direction and the runners 410 coupling those proof masses are displaced in the y-direction. The runners 408 and 410 coupling proof mass 402a with 402b and proof mass 402c with 402d are not displaced in this state of operation.

In FIG. 4B, the synchronized mass MEMS gyroscope is deformed in connection with linear anti-phase motion of the proof masses 402a-402d parallel to the y-axis. Specifically, proof masses 402a and 402d are displaced in the y-direction from their equilibrium positions and proof masses 402b and 204c are displaced in the negative y-direction. This motion may be associated with a sense mode of operation of the MEMS gyroscope, as a non-limiting example. In this state, the runners 408 and 410 coupling the proof mass 402a with 402b and proof mass 402c with 402d are displaced in the directions indicated by the bold arrows. Specifically, the runners 408 are displaced in the x-direction and the runners 410 are displaced in the negative x-direction. The runners 408 and 410 coupling proof mass 402a with 402c and proof mass 402b with 402d are not displaced in this state of operation.

It should be appreciated from FIGS. 4A-4B that the runners 408 and 410 may enforce linear anti-phase motion of the proof masses 402a-402d in both the x and y-directions, but that the motion of the proof masses in those two directions is decoupled. Thus, two degrees of freedom are provided, facilitating accurate operation of the device as a gyroscope.

While synchronized mass MEMS gyroscope 400 illustrates runners of the type described previously in connection with FIGS. 2H and 2I, it should be appreciated that any of the types of runners described herein may be used. For example, the constrained runners of FIGS. 2L and 2M may instead be implemented in place of runners 408 and 410. Thus, the particular construction of MEMS gyroscope 400 is a non-limiting example of a synchronized mass gyroscope.

Figure 4C:
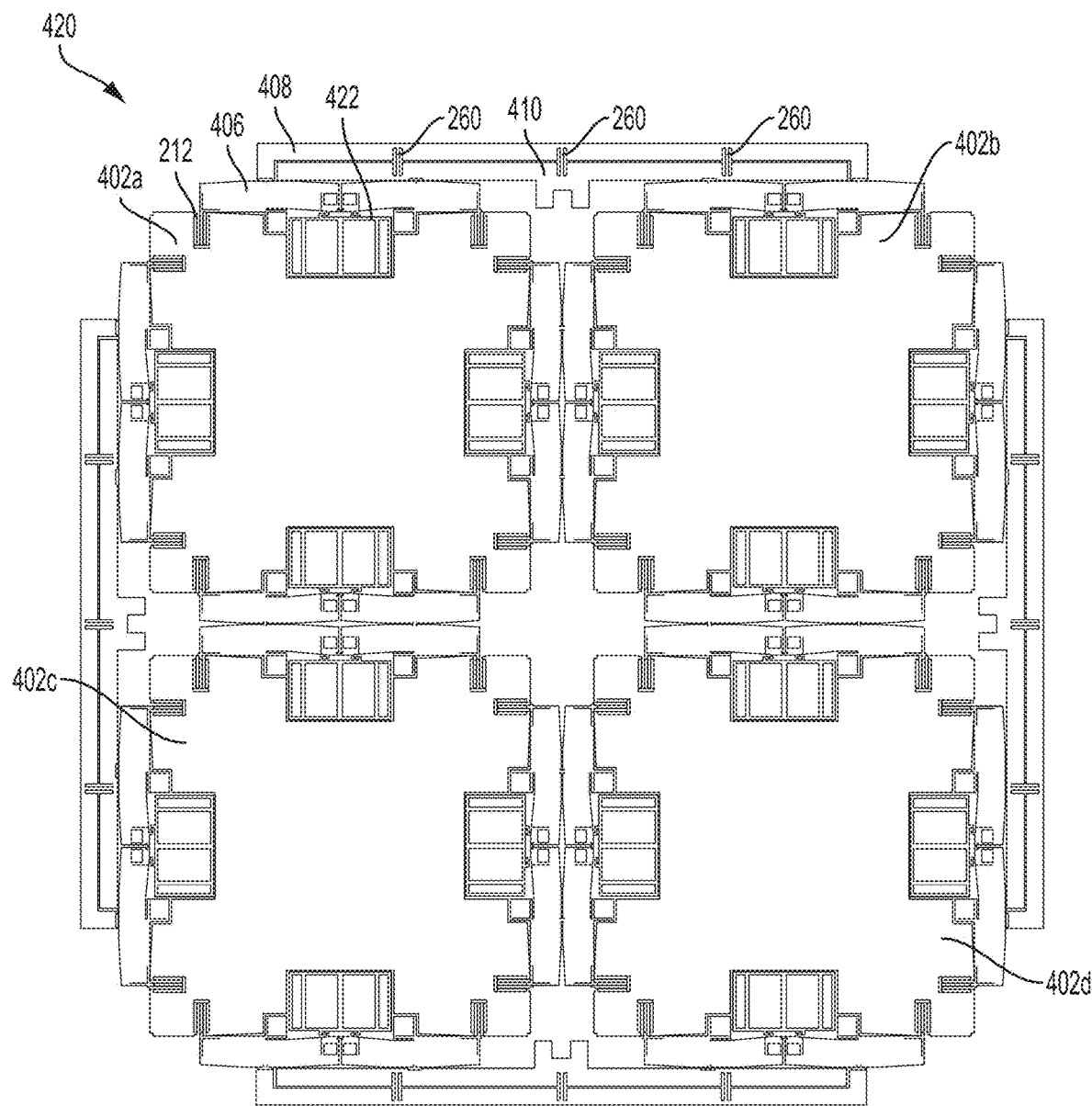
FIG. 4C illustrates a synchronized mass gyroscope according to a non-limiting embodiment of the present application.

FIG. 4C illustrates an alternative configuration of a synchronized mass gyroscope. The synchronized mass gyroscope 420 includes four proof masses 402a-402d, the tethers 212, pivoting linkages 406, runners 408 and 410, coupler 260, and shuttle 422. In this non-limiting example, the runners 408 are coupled with respective runners 410 by the couplers 260. The couplers 260 are of the type illustrated in FIG. 2K, and were described previously in connection with that figure. They may be relatively short, but allow the runners 408 and 410 to move relative to each other. In FIG. 4C, each runner 408 is coupled to a respective runner 410 by three couplers 260. However, other numbers of couplers 260 may be used, including a single coupler 260 coupling a runner 408 to a corresponding runner 410.

In the synchronized mass gyroscope 420 of FIG. 4C, the pivoting linkages 406 are coupled directly to the proof masses, rather than coupling through a shuttle. Here, the shuttle 422 is made smaller than the shuttles 404 of FIGS. 4A-4B, which may provide the gyroscope 420 with a larger angular gain. Angular gain is the ratio of the mass responding to the angular rotation to the total modal mass of the sense mode.

It should be appreciated from the foregoing that aspects of the present application provide synchronized mass gyroscopes. The synchronized mass gyroscopes may have four coupled proof masses configured to move linearly along transverse directions, and a plurality of runners disposed at a periphery of the proof mass arrangement that enforce linear anti-phase motion of the proof masses. The runners themselves move linearly, and may do so in a momentum balanced manner such that they have a net momentum of substantially zero. The runners may decouple motion of the proof masses parallel to one axis from motion of the proof masses parallel to a second axis. Thus, drive and sense modes may remain decoupled from each other, while both modes may exhibit linear anti-phase motion.

As has been described, aspects of the present application provide MEMS devices including multiple movable proof masses coupled by couplers which constrain the proof masses to linear, anti-phase motion, and in which the couplers themselves move linearly. The devices may be resonators, gyroscopes, or accelerometers, among other possible devices. Various systems may employ such devices. Accordingly, various aspects of the present application provide MEMS devices having runners of the types described herein, with the devices being used in various settings to detect rotation, including sports, healthcare, military, and industrial applications, among others. Some non-limiting examples are now described.

A system employing a MEMS device of the types described herein may include a power source coupled to the device, processing circuitry (e.g., sense circuitry) configured to process electrical signals generated by the device to assess a characteristic of interest, such as rotation, and/or communication circuitry to communicate with external devices, wirelessly or by a wired connection. Such components may be combined into a single housing, thus providing an integrated product.

Figure 5:
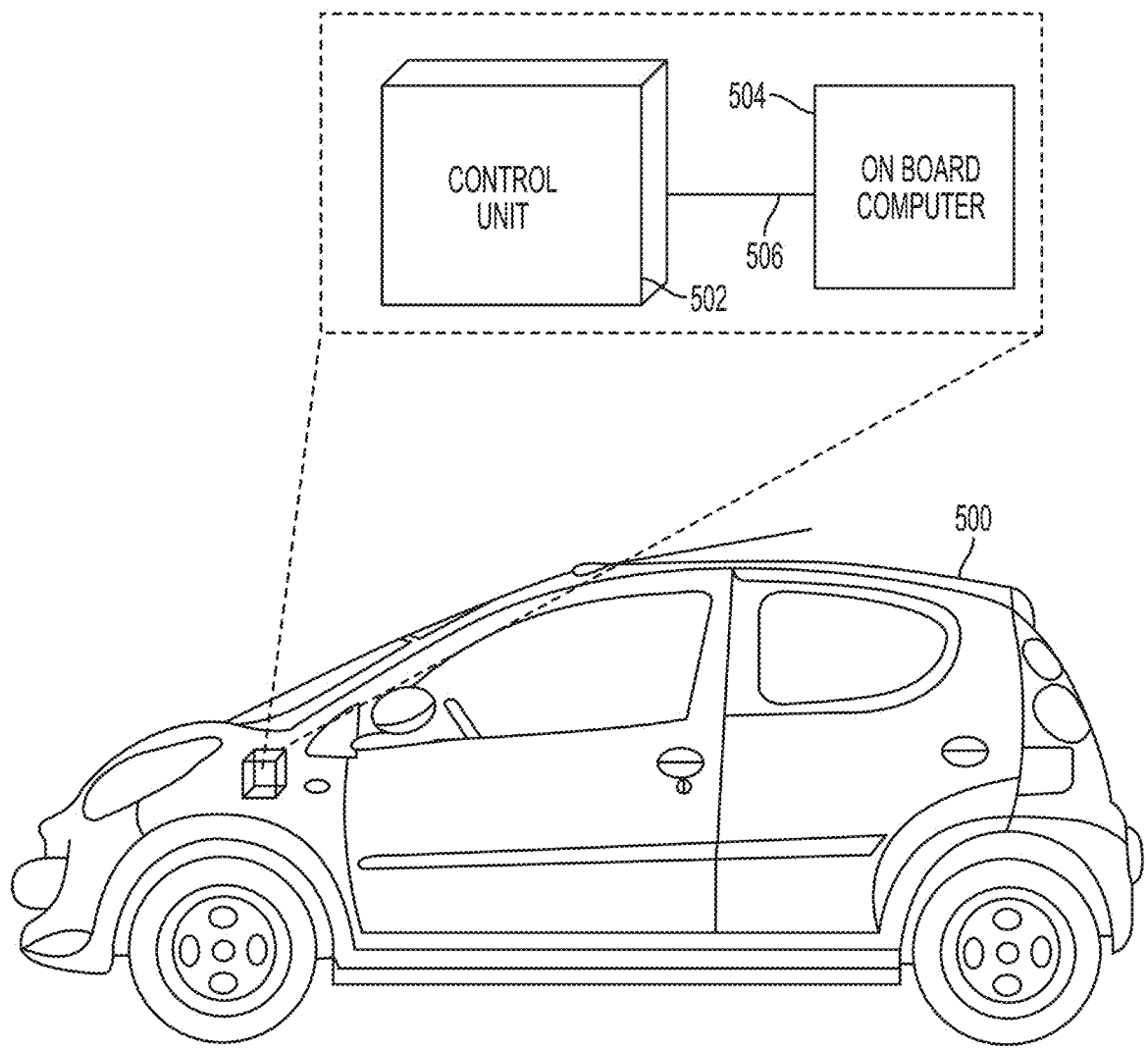
FIG. 5 illustrates an automobile which may employ MEMS devices of the types described herein, according to a non-limiting embodiment of the present application.

MEMS devices of the types described herein may be used in a variety of devices, products, and settings. One such setting is in vehicles, such as automobiles, boats, and aircraft. FIG. 5 illustrates an example in which a MEMS device the types described herein is employed in a car. In the example of FIG. 5, an automobile 500 includes a control unit 502 coupled to an onboard computer 504 of the car by a wired or wireless connection 506. Control unit 502 may comprise a MEMS sensor or MEMS device of the types described herein, optionally together with a power source, processing circuit, interface circuitry for communicating over the connection 506, or any other suitable components. As a non-limiting example, the control unit 502 may include a MEMS gyroscope of the types described herein. The MEMS gyroscope may sense yaw of the automobile 500, as an example. The control unit 502 may comprise a package or housing attached to a suitable part of the automobile 500, with the MEMS device inside. Control unit 502 may receive power and control signals from the onboard computer 504, and may supply sense signals to the onboard computer 504.

Another setting in which MEMS devices of the types described herein may be used is in sensor devices for sports applications, such as tennis, swimming, running, baseball, or hockey, among other possibilities. In some embodiments, a MEMS gyroscope of the types described herein may be part of a wearable fitness device. In other embodiments, the sensor may be part of a piece of sporting equipment, such as being part of a tennis racket, baseball bat, or hockey stick. Sense data from the sensor may be used to assess performance of the user.

Various embodiments described to this point have illustrated operation of gyroscopes with respect to detecting rotation in the plane of the proof masses. Such gyroscopes are referred to as yaw gyroscopes. However, the use of runners as described herein may be applied to gyroscopes detecting other forms of rotation, in addition to or as an alternative to detecting yaw. For example, gyroscopes detecting both yaw and pitch, both roll and pitch, or all three of yaw, roll, and pitch, may utilize runners of the types described herein, coupling multiple proof masses together and linearly translating in response to anti-phase motion of the proof masses. Thus, it should be appreciated that those embodiments described herein relating to gyroscopes are not limited in the type of gyroscope provided.

Various embodiments described to this point provide MEMS gyroscopes with linearly moving couplers coupling together two or more proof masses of the gyroscope. Such couplers may also be used with multiple-mass resonators. Thus, aspects of the present application provide resonators having a plurality of proof masses coupled together by linearly moving couplers.

Aspects of the present application provide MEMS devices (e.g., gyroscopes, accelerometers, and resonators) exhibiting various beneficial characteristics, at least some of which have been described already. It should be appreciated that not all aspects of the application necessarily provide each benefit, nor are the benefits limited to those described herein. Some examples are now described.

According to aspects of the present application, multiple-proof-mass MEMS devices are provided, exhibiting a low degree of acceleration sensitivity (which may also be described as being acceleration insensitive). Thus, gyroscopes, for example, may exhibit highly accurate performance with respect to rotation detection. Some aspects of the present application provide MEMS gyroscopes which operate in a an antisymmetric manner in both drive and sense modes. Aspects of the present application provide MEMS gyroscopes which are relatively insensitive to quadrature, in addition to those benefits described above. Moreover, the fabrication of such devices including runners may be relatively simple and accurate compared with fabrication of other types of couplers. Thus, high precision MEMS devices exhibiting highly accurate synchronous, anti-phase motion may be realized even with manufacturing errors associated with typical microfabrication techniques.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A multiple-mass, balanced microelectromechanical systems (MEMS) device, comprising:
 a substrate;
 a first proof mass suspended above the substrate and configured to move linearly;
 first and second shuttle masses each elastically coupled to the first proof mass, and a first pivoting linkage hingedly coupled to the first shuttle mass;
 a second proof mass suspended above the substrate and configured to move linearly;
 third and fourth shuttle masses each elastically coupled to the second proof mass, and a second pivoting linkage hingedly coupled to the third shuttle mass; and
 a first coupler coupling the first and second pivoting linkages together and comprising a bar extending in a first direction, the bar being configured to move linearly in the first direction when the first proof mass moves in a second direction and the second proof mass moves in a third direction opposite the second direction, wherein a first end of the bar is coupled to the first pivoting linkage and a second end of the bar is coupled to the second pivoting linkage.

2. The multiple-mass, balanced MEMS device of claim 1, wherein the first and second proof masses define, at least in part, a proof mass arrangement, wherein the first coupler is disposed on a first side of the proof mass arrangement, and wherein the multiple-mass, balanced MEMS device further comprises a second coupler disposed on a second side of the proof mass arrangement opposite the first side, and configured to move linearly opposite the bar when the first and second proof masses exhibit linear anti-phase motion.

3. The multiple-mass, balanced MEMS device of claim 1, further comprising a second coupler coupling the first and second proof masses together and configured to move linearly opposite the bar when the first proof mass moves in the second direction and the second proof mass moves in the third direction, opposite the second direction, wherein the first and second couplers are coupled to a same side of the first proof mass.

4. The multiple-mass, balanced MEMS device of claim 3, wherein the first and second proof masses define, at least in part, a proof mass arrangement, and wherein the multiple-mass, balanced MEMS device further comprises third and fourth couplers on an opposite side of the proof mass arrangement from the first and second couplers, wherein the third coupler is configured to move linearly in a same direction as the bar and the fourth coupler is configured to move linearly in a same direction as the second coupler when the first proof mass moves in the second direction and the second proof mass moves in the third direction, opposite the second direction.

5. The multiple-mass, balanced MEMS device of claim 1, wherein the first direction is perpendicular to the second direction.

6. The multiple-mass, balanced MEMS device of claim 3, wherein the first coupler is proximate the first and second proof masses and the second coupler is distal the first and second proof masses.

7. The multiple-mass, balanced MEMS device of claim 1, wherein the first pivoting linkage is configured to pivot when the first proof mass moves in the second direction, wherein the first shuttle mass is configured to move in the second direction when the first proof mass moves in the second direction, and wherein the third shuttle mass is configured to move in the third direction when the second proof mass moves in the third direction.

8. The multiple-mass, balanced MEMS device of claim 1, wherein the second shuttle mass is coupled to the fourth shuttle mass.

9. A method of operating a multiple-mass, balanced microelectromechanical systems (MEMS) device, the method comprising:
 moving a first proof mass in a first direction and second proof mass in a second direction opposite the first direction, the first proof mass being elastically coupled to each of first and second shuttle masses, and the second proof mass being elastically coupled to each of third and fourth shuttle masses;
 wherein moving the first and second proof masses comprises:
  moving the first shuttle mass in the first direction and moving the third shuttle mass in the second direction;
  pivoting a first pivoting linkage hingedly coupled to the first shuttle mass and pivoting a second pivoting linkage hingedly coupled to the third shuttle mass; and
  linearly translating a first bar along a third direction different than both the first direction and the second direction, wherein the first bar couples the first and second pivoting linkages together.

10. The method of operating the multiple-mass, balanced MEMS device of claim 9, wherein the first and second proof masses define, at least in part, a proof mass arrangement, wherein the first bar is disposed on a first side of the proof mass arrangement, and wherein moving the first and second proof masses further comprises linearly translating a second bar in a direction opposite the first bar, the second bar being disposed on a second side of the proof mass arrangement opposite the first side.

11. The method of operating the multiple-mass, balanced MEMS device of claim 9, wherein moving the first and second proof masses further comprises linearly translating a second bar, further coupling the first and second pivoting linkages together, in an opposite direction to that of the first bar.

12. The method of operating the multiple-mass, balanced MEMS device of claim 11, wherein the first and second proof masses define, at least in part, a proof mass arrangement, and wherein the multiple-mass, balanced MEMS device further comprises third and fourth bars on an opposite side of the proof mass arrangement from the first and second bars, wherein moving the first and second proof masses further comprises linearly translating the third bar in a same direction as the first bar and linearly translating the fourth bar in a same direction as the second bar.

13. The method of operating the multiple-mass, balanced MEMS device of claim 9, wherein the first direction is perpendicular to the third direction.

14. The method of operating the multiple-mass, balanced MEMS device of claim 11, wherein linearly translating the first bar comprises linearly translating the first bar along an axis proximate the first and second proof masses and wherein linearly translating the second bar comprises linearly translating the second bar along an axis distal the first and second proof masses.

15. The method of operating the multiple-mass, balanced MEMS device of claim 9, wherein pivoting the first pivoting linkage and the second pivoting linkage comprises:
   pivoting the first pivoting linkage clockwise; and
   pivoting the second pivoting linkage counterclockwise.

16. The method of operating the multiple-mass, balanced MEMS device of claim 9, wherein moving the first and second proof masses further comprises pivoting a third pivoting linkage coupled to the second shuttle mass and pivoting a fourth pivoting linkage coupled to the fourth shuttle mass, the third and fourth pivoting linkages being coupled to one another.

17. A multiple-mass, balanced microelectromechanical systems (MEMS) device, comprising:
   a substrate;
   a first proof mass suspended above the substrate and configured to move linearly;
   a first shuttle mass elastically coupled to the first proof mass;
   first and second pivoting linkages each hingedly coupled to the first shuttle mass;
   a second proof mass suspended above the substrate and configured to move linearly;
   a second shuttle mass elastically coupled to the second proof mass;
   third and fourth pivoting linkages each hingedly coupled to the second shuttle mass; and
   means for inhibiting linear in-phase motion of the first and second proof masses, the means comprising a bar configured to move linearly, the bar having a first end coupled to the first pivoting linkage and a second end coupled to the third pivoting linkage.

18. The multiple-mass, balanced MEMS device of claim 17, wherein the first pivoting linkage is configured to pivot clockwise when the second pivoting linkage pivots counterclockwise.

19. The multiple-mass, balanced MEMS device of claim 17, wherein the means for inhibiting linear in-phase motion of the first and second proof masses further comprises a coupler coupling the first end of the bar with the first pivoting linkage.

20. The multiple-mass, balanced MEMS device of claim 17, further comprising:
   a third shuttle mass elastically coupled to the first proof mass and a fourth shuttle mass elastically coupled to the second proof mass; and
   a fifth pivoting linkage hingedly coupled to the third shuttle mass and a sixth pivoting linkage hingedly coupled to the fourth shuttle mass, wherein the fifth and sixth pivoting linkages are coupled to one another.

* * * * *

UNITED STATES PATENT AND TRADEMARK OFFICE
CERTIFICATE OF CORRECTION

PATENT NO. : 10,697,774 B2
APPLICATION NO. : 15/383366
DATED : June 30, 2020
INVENTOR(S) : Igor P. Prikhodko et al.

Page 1 of 1

It is certified that error appears in the above-identified patent and that said Letters Patent is hereby corrected as shown below:

In Claim 15, at Column 23, Line 20 delete "clockewise" and replace it with --clockwise--.

Signed and Sealed this
Tenth Day of November, 2020

Andrei Iancu
*Director of the United States Patent and Trademark Office*